US009898518B2

(12) United States Patent
Fukunaka

(10) Patent No.: US 9,898,518 B2
(45) Date of Patent: Feb. 20, 2018

(54) COMPUTER SYSTEM, DATA ALLOCATION MANAGEMENT METHOD, AND PROGRAM

(75) Inventor: Katsuhiro Fukunaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 14/385,532

(22) PCT Filed: Apr. 12, 2012

(86) PCT No.: PCT/JP2012/059972
§ 371 (c)(1),
(2), (4) Date: Sep. 16, 2014

(87) PCT Pub. No.: WO2013/153646
PCT Pub. Date: Oct. 17, 2013

(65) Prior Publication Data
US 2015/0046399 A1  Feb. 12, 2015

(51) Int. Cl.
*G06F 17/30* (2006.01)
*G06F 11/20* (2006.01)
(Continued)

(52) U.S. Cl.
CPC .... *G06F 17/30575* (2013.01); *G06F 11/2094* (2013.01); *G06F 11/3433* (2013.01); *G06F 17/30174* (2013.01); *H04L 67/28* (2013.01)

(58) Field of Classification Search
CPC ............... G06F 17/30575; G06F 17/30174
(Continued)

(56) References Cited

U.S. PATENT DOCUMENTS 5,659,614 A * 8/1997 Bailey, III .......... G06F 11/1451
707/999.001
5,987,506 A * 11/1999 Carter ................. G06F 9/5016
707/999.01
(Continued)

FOREIGN PATENT DOCUMENTS

JP  05-233390 A  9/1993
JP  2002-297428 A  10/2002

OTHER PUBLICATIONS

Miyagi et al., "A study of the method to distribute data replication in distributed database for session control server", 2011 Nen IEICE Communications Society Conference Koen Ronbunshu 2, Aug. 30, 2011, p. 418.
(Continued)

*Primary Examiner* — Mark E Hershley
(74) *Attorney, Agent, or Firm* — Mattingly & Malur, PC

(57) ABSTRACT

A computer system comprises a plurality of computers for executing a service by using databases constructed of storage areas included in the plurality of computers. Each of the plurality of computers is configured to hold performance management information for managing respective performances of the plurality of computers. The each of the plurality of computers is allocated master data and replicated data of the master data managed by one of the plurality of computers other than the each of the plurality of computers. The computer system comprises a performance information management part configured to update the performance management information; and a cluster configuration management part configured to determine, based on the performance management information, the management range of the master data managed by a computer and a sub-computers configured to hold the replicated data of the master data managed by the computer.

18 Claims, 17 Drawing Sheets

(51) Int. Cl.
*G06F 11/34* (2006.01)
*H04L 29/08* (2006.01)

(58) Field of Classification Search
USPC .......................................................... 707/634
See application file for complete search history.

(56) References Cited

U.S. PATENT DOCUMENTS

| | | | |
|---|---|---|---|
| 6,976,040 B2 | 12/2005 | Shin et al. | |
| 7,330,997 B1* | 2/2008 | Odom ................. | G06F 11/1464 711/162 |
| 7,831,789 B1* | 11/2010 | Per ..................... | G06F 11/1451 707/625 |
| 7,877,511 B1* | 1/2011 | Berger .............. | G06F 17/30067 709/201 |
| 2002/0143740 A1* | 10/2002 | Shin ................. | G06F 17/30575 |
| 2002/0173984 A1* | 11/2002 | Robertson ............. | G06Q 10/10 709/220 |
| 2002/0188704 A1* | 12/2002 | Gold ...................... | G06F 21/10 709/221 |
| 2004/0153528 A1* | 8/2004 | Suzuki ................... | G06F 21/10 709/219 |
| 2007/0180290 A1* | 8/2007 | Stevenson .......... | G06F 11/1456 714/5.1 |
| 2008/0046483 A1* | 2/2008 | Lehr ................. | G06F 11/1451 |
| 2009/0254572 A1* | 10/2009 | Redlich ................. | G06Q 10/06 |
| 2009/0287986 A1* | 11/2009 | Vishniac ........... | G06F 17/30067 714/819 |
| 2009/0313364 A1* | 12/2009 | Parsons .................. | H04L 12/66 709/223 |
| 2010/0169280 A1* | 7/2010 | Shi ....................... | H04L 67/104 707/640 |
| 2010/0250497 A1* | 9/2010 | Redlich .................. | F41H 13/00 707/661 |
| 2010/0333116 A1* | 12/2010 | Prahlad ................ | G06F 17/302 719/328 |
| 2011/0082908 A1* | 4/2011 | Ban ..................... | G06F 12/0813 709/213 |
| 2011/0187511 A1* | 8/2011 | Boldyrev ................ | H04Q 5/22 340/10.51 |
| 2011/0191299 A1* | 8/2011 | Huynh Huu ........... | G06F 17/30 707/646 |
| 2011/0307736 A1* | 12/2011 | George ............ | G06F 17/30519 714/6.2 |
| 2011/0307745 A1* | 12/2011 | McCune ........... | G06F 17/30221 714/54 |
| 2012/0084597 A1* | 4/2012 | Yasui .................. | G06F 11/1482 714/4.11 |
| 2012/0233417 A1* | 9/2012 | Kalach ................ | G06F 11/1469 711/162 |
| 2013/0110969 A1* | 5/2013 | Wertheimer ........ | G06F 11/1448 709/216 |
| 2014/0032496 A1* | 1/2014 | Urano ................. | G06F 11/2053 707/634 |
| 2014/0059315 A1* | 2/2014 | Iwashita ............... | G06F 3/0619 711/162 |

OTHER PUBLICATIONS

Nakasato et al., "A method of virtual server deployment for Consistent Hashing considering server performance and server load change", 2011 Nen IEICE Communications Society Conference Koen Ronbunshu 2, Aug. 30, 2011, p. 102.

Nakamura et al., "A Cloud Storage Supporting both Read-Intensive and Write-Intensive Workloads", IPSJ SIG Notes 2011 (Heisei 22) Nendo 1 [CD-ROM], Jun. 15, 2011, No. 117, pp. 1 to 9.

\* cited by examiner

PERFORMANCE MANAGEMENT INFORMATION

| SERVER ID | | SERVER A | SERVER B | SERVER C | SERVER D | SERVER E |
|---|---|---|---|---|---|---|
| SPECIFICATIONS | PROCESSOR PERFORMANCE | 3GHz | 2GHz | 2GHz | 2GHz | 2GHz |
| | MEMORY PERFORMANCE | 3GB | 2GB | 3GB | 1GB | 4GB |
| | COMMUNICATION PERFORMANCE | 100Mbps | 10Mbps | 100Mbps | 10Mbps | 100Mbps |
| RANGE RATE | | - | - | - | - | - |

Fig. 5

| SERVER ID | SERVER A | SERVER B | SERVER C | SERVER D | SERVER E |
|---|---|---|---|---|---|
| MEMORY CAPACITY | 3GB | 2GB | 3GB | 1GB | 4GB |
| ASSIGNED RANGE | - | - | - | - | - |

Fig. 11A

| SERVER ID | SERVER E | SERVER A | SERVER C | SERVER B | SERVER D |
|---|---|---|---|---|---|
| MEMORY CAPACITY | 4GB | 3GB | 3GB | 2GB | 1GB |
| ASSIGNED RANGE | - | - | - | - | - |

Fig. 11B

| SERVER ID | SERVER E | SERVER A | SERVER C | SERVER B | SERVER D |
|---|---|---|---|---|---|
| MEMORY CAPACITY | 4GB | 3GB | 3GB | 2GB | 1GB |
| ASSIGNED RANGE | 4/13 | 3/13 | 3/13 | 2/13 | 1/13 |

| 911 | 912 | 913 | 914 | 915 |
|---|---|---|---|---|
| SERVER ID | Position | MEMORY CAPACITY | PROCESSOR | COMMUNICATION SPEED |
| SERVER E | 1/13 - 4/13 | 4GB : ☐☐☐☐ | 3GHz | 100Mbps |
| SERVER A | 5/13 - 7/13 | 3GB : ☐☐☐ | 3GHz | 100Mbps |
| SERVER C | 8/13 - 10/13 | 3GB : ☐☐☐ | 2GHz | 100Mbps |
| SERVER B | 11/13 - 12/13 | 2GB : ☐☐ | 2GHz | 10Mbps |
| SERVER D | 13/13 - 13/13 | 1GB : ☐ | 2GHz | 10Mbps |

Fig. 13A

| 911 | 912 | 913 | 914 | 915 |
|---|---|---|---|---|
| SERVER ID | Position | MEMORY CAPACITY | PROCESSOR | COMMUNICATION SPEED |
| SERVER D | 1/13 - 4/13 | 1GB : ☐ | 2GHz | 10Mbps |
| SERVER A | 5/13 - 7/13 | 3GB : ☐☐☐ | 3GHz | 100Mbps |
| SERVER E | 8/13 - 10/13 | 4GB : ☐☐☐☐ | 3GHz | 100Mbps |
| SERVER C | 11/13 - 12/13 | 3GB : ☐☐☐ | 2GHz | 100Mbps |
| SERVER B | 13/13 - 13/13 | 2GB : ☐☐ | 2GHz | 10Mbps |

Fig. 13B

COMPUTER SYSTEM, DATA ALLOCATION MANAGEMENT METHOD, AND PROGRAM

BACKGROUND OF THE INVENTION

This invention relates to a distributed database constructed of a plurality of computers. In particular, this invention relates to setting processing for automatically constructing a distributed database.

In recent years, data amounts have increased explosively in a computer system for executing an application using the Web, and various systems that improve the performance of accessing data by distributing data to a plurality of computers are known. For example, in a relational database management system (RDBMS), a method of improving the access performance in an entire system by splitting data into predetermined ranges and locating the split data in a plurality of computers is known (see, for example, JP 2002-297428 A).

In JP 2002-297428 A, there is disclosed an invention in which the only one original site on a network executes processing of updating data stored in each of databases allocated to the plurality of computers on the network, and each of other replica sites receives an updating result executed by the original site to reflect the updating result in replica data held by the replica site itself. With this configuration, it is possible to maintain uniformity of data used by the plurality of computers on the network.

Moreover, a NoSQL (Not only SQL) database such as KVS (Key Value Store) that locates cache data made up of keys which are data identifiers and data values (values) in a plurality of computer systems according to a predetermined distribution method is known as a system that is used in a cache server or the like.

The KVS employs various configurations such as a configuration of storing data in a volatile storage medium (for example, a memory) capable of accessing data at high speed, a configuration of storing data in a nonvolatile recording medium (for example, solid state disk (SSD), HDD, or the like) having excellent persistent data storage properties, or a combination configuration thereof.

In the combination configuration, the balance between a memory store formed by integrating the memories of a plurality of computers and a disk store made up of a nonvolatile storage medium of at least one computer can be changed in various ways according to various operating policies such as a policy that emphasizes high-speed accessibility or a policy that emphasizes data storage properties.

In the memory store and the disk store, data (values) and data identifiers (keys) are stored as pairs.

Moreover, in the KVS, a plurality of servers forms a cluster, and data is distributed and located in the servers included in the cluster to realize parallel processing. Specifically, data corresponding to a management range (for example, a key range) which is a range of data managed by a server is stored in the respective servers. Each server executes processing as a master of the data included in the management range that the server is in charge of. That is, a server in charge of the data of a management range in which a predetermined key is included reads the data corresponding to the key in response to a read request that includes the predetermined key.

Thus, the KVS can improve the parallel processing performance by scale-out.

In the KVS, a system that employs a configuration in which a server that constitutes a cluster stores copy data of the data managed by another server in order to secure data reliability is known. That is, each server is a master that manages data included in a predetermined management range and is a slave that holds the copy data managed by another server. Due to this, even when a failure occurs in a server, processes can be continuously performed since another server which is a slave uses the copy data held by the server as master data instead of the data managed by the failed server as a master.

It should be noted that the server as the master is hereinafter also referred to as "master server" and the server as the slave is hereinafter also referred to as "slave server".

As described above, a single point of failure does not exist because the servers that constitute the KVS do not have a special server like a management server. That is, since another server can continue processing even when a certain server fails, the computer system does not stop. Accordingly, the KVS can also ensure a failure tolerance.

It should be noted that the computer system can arbitrarily determine the number of slave servers, in other words, the number of servers to which the replicated data is to be stored.

As a method of allocating data in a distributed manner used in the KVS or the like, various methods, such as consistent hashing method, a range method, and a list method, are used.

For example, in consistent hashing, first, a hash value of a key is calculated, and the residue of a division of the calculated hash value by the number of servers is calculated. Data is located in a server of which the identification number is identical to the residue.

SUMMARY OF THE INVENTION

In a related-art on-premises system (for example, system operation in the same company), it is general to construct the distributed KVS by using the servers having the same performance and operate the distributed KVS. In cloud computing, however, it is necessary to construct the distributed KVS by using servers having different performances and operate the distributed KVS. In this case, the performance of the system may be degraded unless the difference in performance among the respective servers is considered.

In a case where consistent hashing is used to construct the distributed KVS, a plurality of pieces of data is allocated at equal intervals in a distributed manner in the related-art system. In the cloud computing, however, it is necessary to determine an amount of data to be assigned to each of the servers, in other words, the management range, in consideration of the difference in performance among the servers. In addition, in order to set the slave server, it is necessary to consider the performance of the master server and the performance of the slave server.

For example, in a case where settings are made so that the server having a small memory capacity holds a plurality of pieces of replicated data of the server having a large memory capacity, all of the plurality of pieces of replicated data cannot be stored in the memory of the server having a small memory capacity. It is therefore necessary to store the part of the plurality of pieces of replicated data in a storage, such as an HDD, and hence access performance of the entire system may be degraded.

As another example, in a case where settings are made so that the server having a large memory capacity holds the plurality of pieces of replicated data stored in the server having a small memory capacity, a memory usage of the server having a large memory capacity is small, and hence a memory usage efficiency of the entire system maybe degraded.

For the above-mentioned reasons, with the related art, in a case where the cloud computing is used to construct the distributed KVS, an administrator needs to manually make settings for allocating data in a distributed manner (set the management range and the slave server).

This invention has been made in view of the above-mentioned problems. Specifically, it is an object of this invention to automatically make settings for allocating a plurality of pieces of data in a distributed manner based on performances of servers in a case where cloud computing is used to construct a distributed KVS.

The present invention can be appreciated by the description which follows in conjunction with the following figures, wherein: a computer system, comprises a plurality of computers coupled to one another via a network, for executing a service by using databases constructed of storage areas included in the plurality of computers. Each of the plurality of computers includes: a processor; a storage apparatus coupled to the processor; and a network interface configured to communicate to and from the plurality of computers other than the each of the plurality of computers via the network. The each of the plurality of computers is configured to hold performance management information for managing respective performances of the plurality of computers. The database stores a plurality of pieces of data formed of a key and a data value. The each of the plurality of computers is allocated thereto: a plurality of pieces of master data managed by the each of the plurality of computers as a master based on a distributed algorithm for determining a management range indicating a range of the keys allocated to the each of the plurality of computers; and a plurality of pieces of replicated data of the plurality of pieces of master data managed by one of the plurality of computers other than the each of the plurality of computers. The computer system further comprises: a performance information management part configured to obtain information on the performance from the each of the plurality of computers and update the performance management information based on the obtained information; and a cluster configuration management part configured to determine, based on the performance management information, the management range of the plurality of pieces of master data managed by the each of the plurality of computers and a plurality of sub-computers configured to hold the plurality of pieces of replicated data of the plurality of pieces of master data managed by the each of the plurality of computers.

According to one embodiment of this invention, by considering the difference in performance among the respective computers, it is possible to automatically set the management range of each computer and the computer (slave server) for holding the plurality of pieces of replicated data of the plurality of pieces of master data managed by each computer. It is therefore possible to construct an optimal distributed KVS in the cloud computing.

BRIEF DESCRIPTION OF THE DRAWINGS

The present invention can be appreciated by the description which follows in conjunction with the following figures, wherein:

FIG. 5 is an explanatory diagram showing an example of performance management information according to the first embodiment of this invention, FIGS. 11A, 11B, and 11C are explanatory diagrams showing a specific example of the arrangement determination processing, FIGS. 13A and 13B are each an explanatory diagram illustrating an example of a confirmation screen according to the first embodiment of this invention.

DETAILED DESCRIPTION OF THE PREFERRED EMBODIMENTS

In the following description, a description is given by taking, as an example, a distributed KVS to which consistent hashing is applied.

First Embodiment

Figure 1:
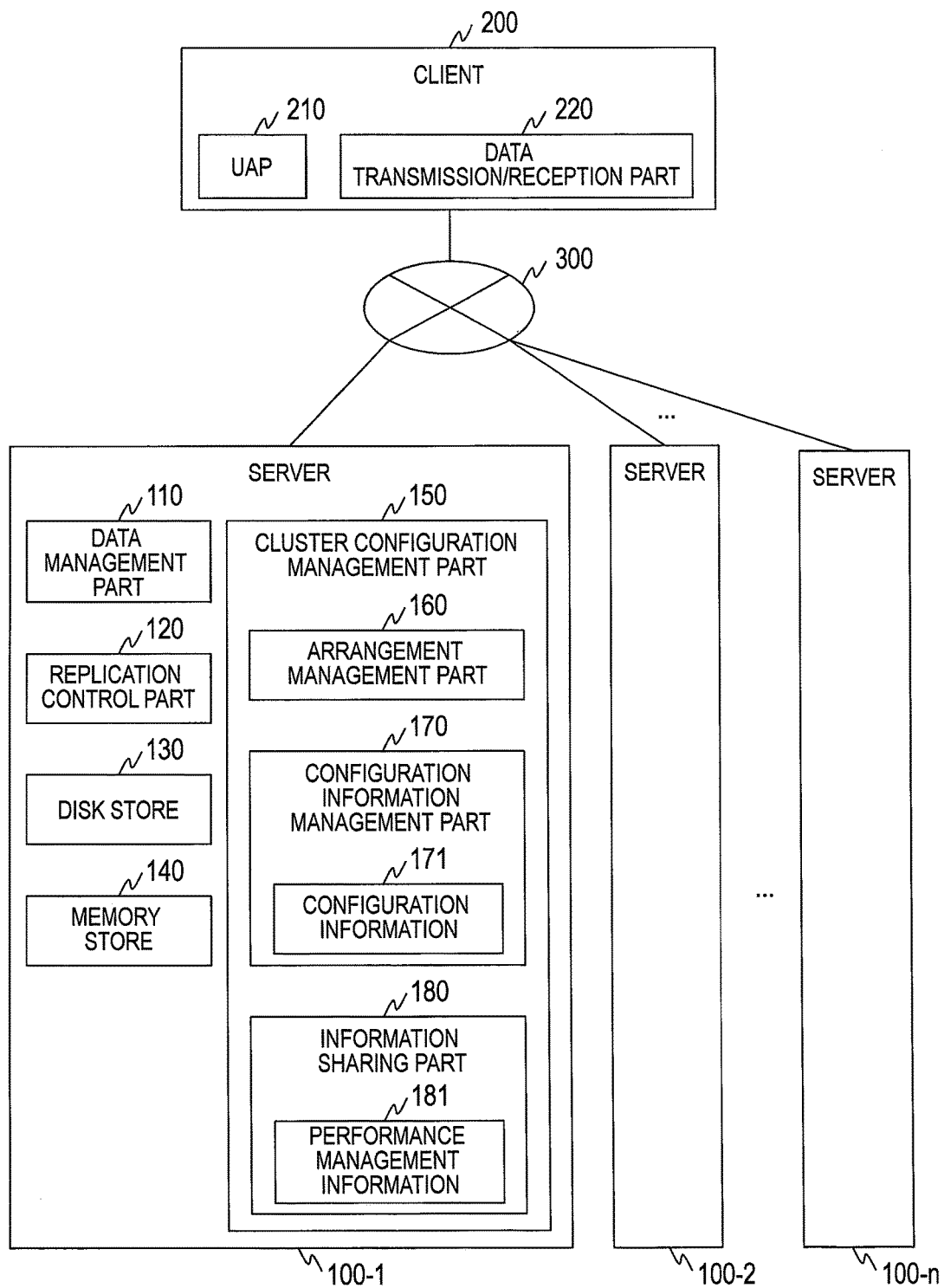
FIG. 1 is a block diagram illustrating a configuration of a computer system according to a first embodiment of this invention.

FIG. 1 is a block diagram illustrating a configuration of a computer system according to a first embodiment of this invention.

The computer system includes a plurality of servers 100, a client 200, and a network 300. The servers 100 are coupled to one another via the network 300, and each of the servers 100 and the client 200 are also coupled to each other via the network 300.

The network 300 may conceivably have various wired and wireless configurations, such as a LAN, a WAN and a SAN. This invention may use any type of network as long as the network to be used enables communication between the servers 100 and the client 200. It should be noted that the network 300 includes a plurality of network apparatuses (not shown). The network apparatus include, for example, a switch, a gateway, and the like.

In this embodiment, the plurality of servers 100 are used to form a cluster, and a NoSQL database is constructed on storage area included in each of these servers 100. It is assumed in this embodiment that a KVS is used as the NoSQL database.

In a server 100-1, a plurality of pieces of data are allocated for each predetermined management range, and the server 100-1 runs as a master server for managing the plurality of pieces of data included in its own management range. Further, the server 100-1 holds a plurality of pieces of replicated data of a plurality of pieces of data included in the management range managed by at least one of other servers 100-2 to 100-$n$, and runs as a slave server. Similarly, the servers 100-2 to 100-$n$ each function as the master server for managing a plurality of pieces of data included in its own management range, and holds a plurality of pieces of replicated data of a plurality of pieces of data included in the management range managed by another server 100 as the master.

The cluster of this embodiment has a configuration in which there is no a single server 100 for managing the entire computer system as a management server and all the servers 100 are treated as equivalent servers. Due to this, in a case where a failure occurs in one server, since another slave server can continue processing as a new master server, it is possible to continue the processing without stopping the computer system.

Each server 100 of this embodiment includes a data management part 110, a replication control part 120, a disk store 130, a memory store 140, and a cluster configuration management part 150.

The disk store 130 and the memory store 140 are databases constructing the KVS. A plurality of pieces of data, which are pairs of keys and values, are stored in the disk store 130 and the memory store 140. It should be noted that Data included in the management range is stored in the disk store 130 and the memory store 140 of each of the servers 100.

An access performance to the memory store 140 is higher than an access performance to the disk store 130, and the plurality of pieces of data are stored in the memory store 140 in normal cases. In the disk store 130, on the other hand, a part of the plurality of pieces of data whose size exceeds the capacity of the memory store 140, a plurality of pieces of data that are less frequently accessed, and the like are stored.

It should be noted that various operations are applicable to the computer system to store master data, such as a configuration in which only the memory store 140 is used without using the disk store 130 and a configuration in which the replicated data of the own and/or another server 100 is stored only in the disk store 130. In particular, an object to be achieved by the distributed KVS system is to increase a speed of response to a requestor. Accordingly, in the configuration in which only the memory store 140 is used, a fast speed of response to every kind of data can be expected not only in a case where the server is switched between the master and the slave. On the other hand, in the configuration in which the disk store 130 is additionally used, an effect of data backup when the server is shut down can also be expected.

The data management part 110 controls various types of processing for the plurality of pieces of data managed by the server 100. The data management part 110 receives a request from the client 200 to control processing, such as reading and writing of data, based on the received request.

The replication control part 120 receives an access request from the client 200 and transfers the received access request to the data management part 110. Further, the replication control part 120 transmits a result of processing on the received access request to the client 200. Further, the replication control part 120 replicates the data stored within the management range managed by the own server 100, and transmits the generated replicated data to another server 100.

The cluster configuration management part 150 manages the cluster formed of the plurality of servers 100. The servers 100 included in the cluster are used to construct the distributed KVS. The cluster configuration management part 150 is constructed of a plurality of modules. To be specific, the cluster configuration management part 150 includes an arrangement management part 160, a configuration information management part 170, and an information sharing part 180.

The arrangement management part 160 determines the management range of each server 100 and also determines the server running as the slave server to each server 100. To be more specific, the arrangement management part 160 determines a width of the management range and an arrangement relationship of the slave servers.

As used herein, the "arrangement relationship of the slave servers" refers to information indicating which of the servers 100 is to be set as the slave server to a given server 100.

In this embodiment, the arrangement management part 160 determines the arrangement relationship of the slave servers so that the difference in performance between the master server and the slave server becomes smaller. Further, the arrangement management part 160 generates display information for displaying a processing result.

The configuration information management part 170 manages configuration information 171 for managing the configuration of the distributed KVS constructed on the cluster. The configuration information management part 170 updates the configuration information 171 as necessary. Details of the configuration information 171 are described later with reference to FIG. 4.

The information sharing part 180 manages information on the performance of the server 100, and further, shares the information on the performance of the server 100 with another server 100. The information sharing part 180 can be realized by using, for example, Heartbeat.

Further, the information sharing part 180 holds performance management information 181. The performance management information 181 stores information for managing the performances of all the servers 100 included in the computer system. Details of the performance management information 181 are described later with reference to FIG. 5.

The information sharing part 180 collects the information on the performance of the server 100 to generate performance information on the server 100 based on the collected information. The information sharing part 180 generates or updates the performance management information 181 based on the performance information obtained from each of the servers 100.

The client 200 is a computer including a processor (not shown), a memory (not shown), a network interface (not shown), and others, and issues a request to execute various types of processing on the distributed KVS. The client 200 includes a UAP 210 and a data transmission/reception part 220.

The UAP 210 is an application for providing various types of functions. The UAP 210 transmits the request to execute various types of processing to the server 100. The data transmission/reception part 220 transmits the request output from the UAP 210 to the server 100 and further, receives the processing result from the server 100.

Figure 2:
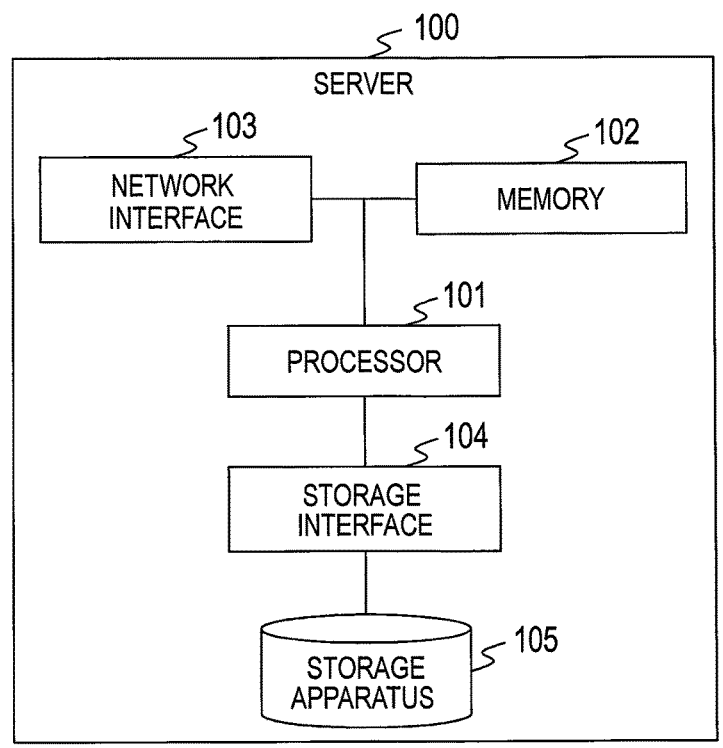
FIG. 2 is an explanatory diagram illustrating an example of a hardware configuration of each server according to the first embodiment of this invention.

FIG. 2 is an explanatory diagram illustrating an example of a hardware configuration of each server 100 according to the first embodiment of this invention.

The server 100 includes a processor 101, a memory 102, a network interface 103, a storage interface 104, and a storage apparatus 105.

The processor 101 executes programs stored in the memory 102. Functions of the server 100 can be implemented by the processor 101 executing the programs. When a program is a subject in a sentence in the following description of processing, it represents that the program is executed by the processor 101.

The memory 102 stores the programs to be executed by the processor 101 and information necessary for executing those programs.

On the memory 102 of this embodiment, programs for implementing the data management part 110, the replication control part 120, and the cluster configuration management part 150 are stored. Further, on the memory 102, the configuration information 171 and the performance management information 181 are stored as the necessary information.

Further, the memory store 140 is constructed on the memory 102. The memory store 140 is the database constructing the distributed KVS. In the memory store 140, a plurality of pieces of data which are pairs of keys and values are stored. Details of the plurality of pieces of data stored in the memory store 140 are described later with reference to FIG. 3.

The storage apparatus 105 stores various types of information. The storage apparatus 105 may conceivably be an HDD or an SSD. On the storage apparatus 105, the disk store 130 constructing the distributed KVS is constructed. As another example, the programs for implementing the data management part 110 and others may also be stored in the storage apparatus 105. In this case, the processor 101 reads the programs from the storage apparatus 105, loads the read programs into the memory 102, and executes the loaded programs.

Figure 3:
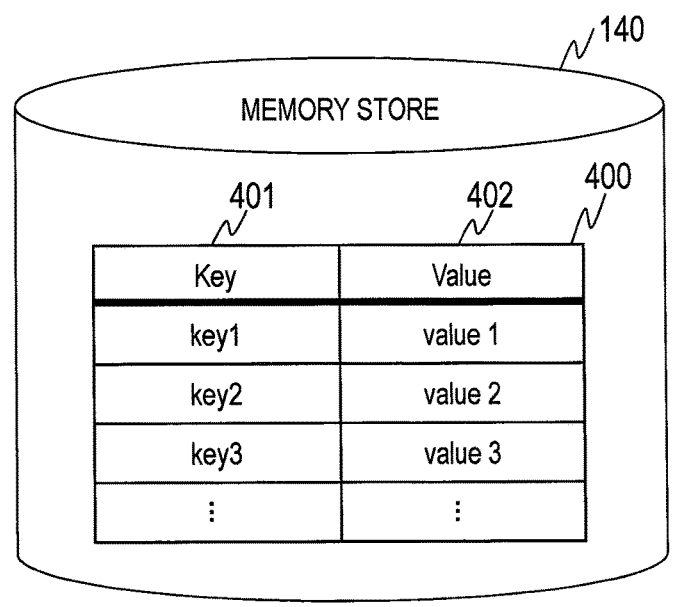
FIG. 3 is an explanatory diagram illustrating an example of a plurality of pieces of data stored in a memory store according to the first embodiment of this invention.

FIG. 3 is an explanatory diagram illustrating an example of the plurality of pieces of data stored in the memory store 140 according to the first embodiment of this invention. It should be noted that data having a similar format is also stored in the disk store 130.

In this embodiment, the memory store 140 stores data management information 400. The data management information 400 includes the plurality of pieces of data, in each of which a key and a value are linked as a pair. The data in which a key and a value are linked as a pair is hereinafter also referred to as "key-value data".

The data management information 400 includes a key 401 and a value 402. The key 401 stores an identifier (key) for identifying data. The value 402 stores actual data (value).

A user who operates the client 200 can save data to the distributed KVS by designating the key 401. The user can also obtain desired data from the distributed KVS by designating the key 401.

Each of the servers 100 manages a plurality of pieces of key-value data for each predetermined management range. In other words, for each management range, the plurality of pieces of key-value data is allocated to each server 100 in a distributed manner. The server 100 thus executes processing as the master server for data included in the assigned management range. This configuration enables a large amount of data to be processed in parallel and at high speed.

Figure 4:
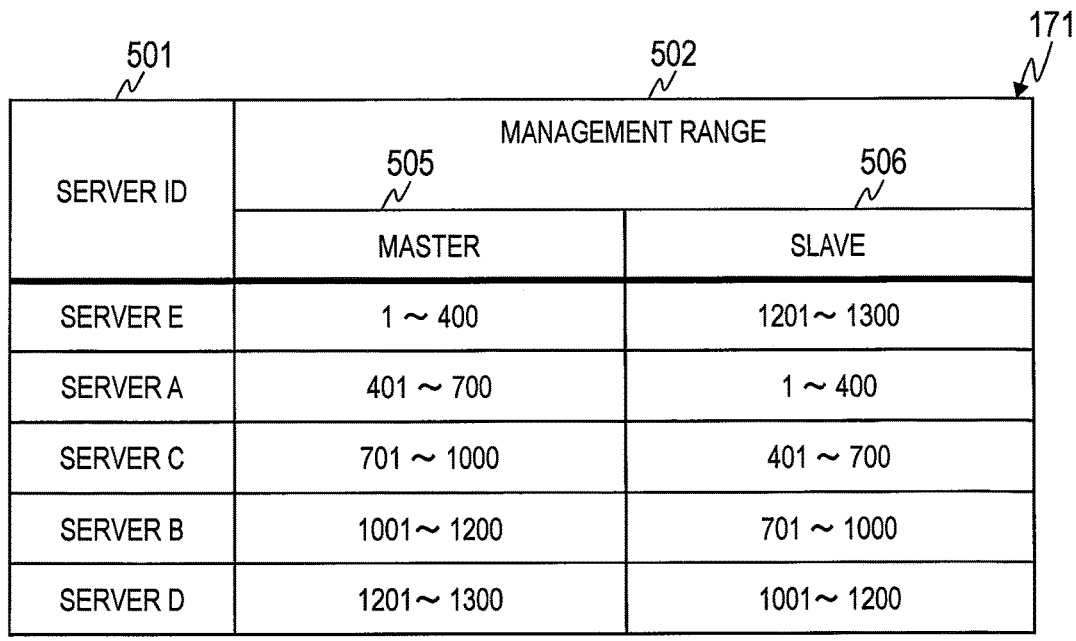
FIG. 4 is an explanatory diagram showing an example of configuration information according to the first embodiment of this invention.

FIG. 4 is an explanatory diagram showing an example of the configuration information 171 according to the first embodiment of this invention.

The configuration information 171 stores information on the management range of each of the servers 100. To be specific, the configuration information 171 includes a server ID 501 and a management range 502.

The server ID 501 stores an identifier for uniquely identifying the server 100. The server ID 501 stores an identifier, an IP address, a MAC address, and the like of the server 100.

The management range 502 stores values of the management range assigned to the server 100. In this embodiment, hash values are stored as the values of the management range.

A master 505 of the management range 502 stores the hash values of the management range managed by the server 100 corresponding to the server ID 501 as the master. A slave 506 of the management range 502 stores the hash values of the management range of the plurality of pieces of replicated data held by the server 100 corresponding to the server ID 501.

It should be noted that, although the plurality of pieces of same replicated data are held by one server 100 in this embodiment, this invention is not limited to this configuration. In other words, the plurality of pieces of same replicated data may be held by two or more slave servers.

FIG. 5 is an explanatory diagram showing an example of the performance management information 181 according to the first embodiment of this invention.

The performance management information 181 stores the information on the performance of each of the servers 100. To be specific, the performance management information 181 includes a server ID 601, specifications 602, and an range rate 603.

The server ID 601 is the same as the server ID 501.

The specifications 602 store the information on the performance of the server 100 corresponding to the server ID 601. In the example shown in FIG. 5, the specifications 602 include a processor performance, a memory performance, and a communication performance. It should be noted that the specifications 602 may also include other types of information, such as the number of channels connecting the processor 101 to the memory 102, a clock frequency of the memory 102, a capacity of the storage apparatus 105, and an rpm of the HDD.

The processor performance stores information indicating the performance of the processor 101 of the server 100. In this embodiment, the frequency of the processor 101 is stored as the processor performance.

The memory performance stores information indicating the performance of the memory 102 of the server 100. In this embodiment, the capacity of the memory 102 is stored as the memory performance.

The communication performance stores information indicating a communication performance of the network interface 103 of the server 100. In this embodiment, a communication speed of the network interface 103 is stored as the communication performance.

The range rate 603 stores information indicating the width of the management range to be assigned to the server 100 (assignment ratio). Further, the range rate 603 also corresponds to a data amount of the plurality of pieces of replicated data held by the slave server.

In this embodiment, the slave server is set so as to hold the plurality of pieces of replicated data of the server 100 corresponding to its right column (entry). It should be noted that the server 100 corresponding to the leftmost column is set as the slave server for holding the plurality of pieces of replicated data of the server 100 corresponding to the rightmost column. Accordingly, in this embodiment, the arrangement of entries (servers 100) of the performance management information 181 corresponds to the arrangement relationship of the slave servers for holding the plurality of pieces of replicated data.

Figure 6:
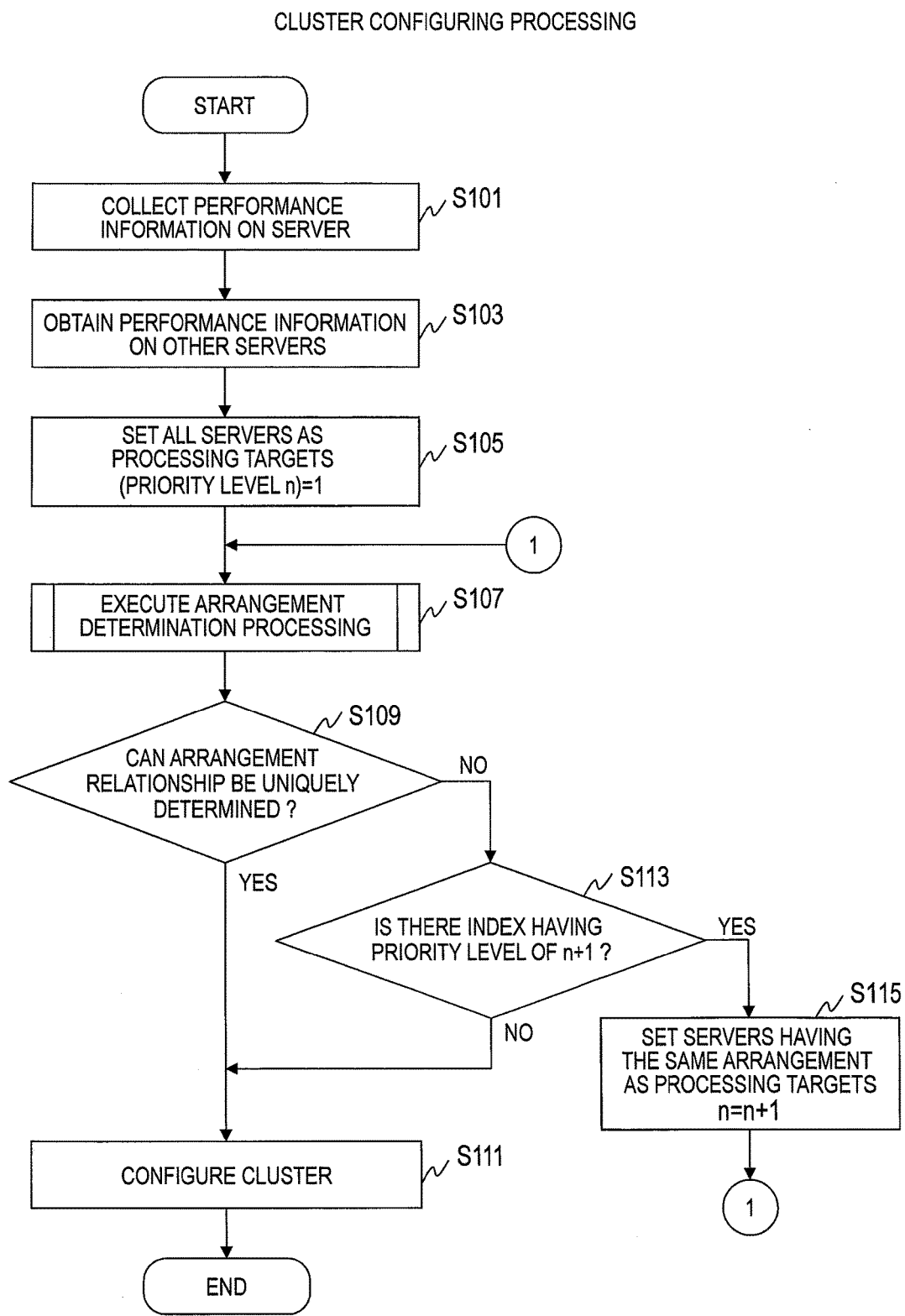
FIG. 6 is a flow chart illustrating processing executed by a server according to the first embodiment of this invention.

FIG. 6 is a flow chart illustrating processing executed by the server 100 according to the first embodiment of this invention.

It is assumed that the processing to be described below is executed by one or more servers 100.

The server 100 starts the processing in a case of receiving a request to configure the cluster from the client 200. The request to configure the cluster includes at least index information for determining the arrangement relationship of the slave servers.

It should be noted that the client 200 can transmit the request to configure the cluster to one or more servers 100. For example, the client 200 transmits the request to configure the cluster to all the servers 100 by multicast transmission.

Figure 7:
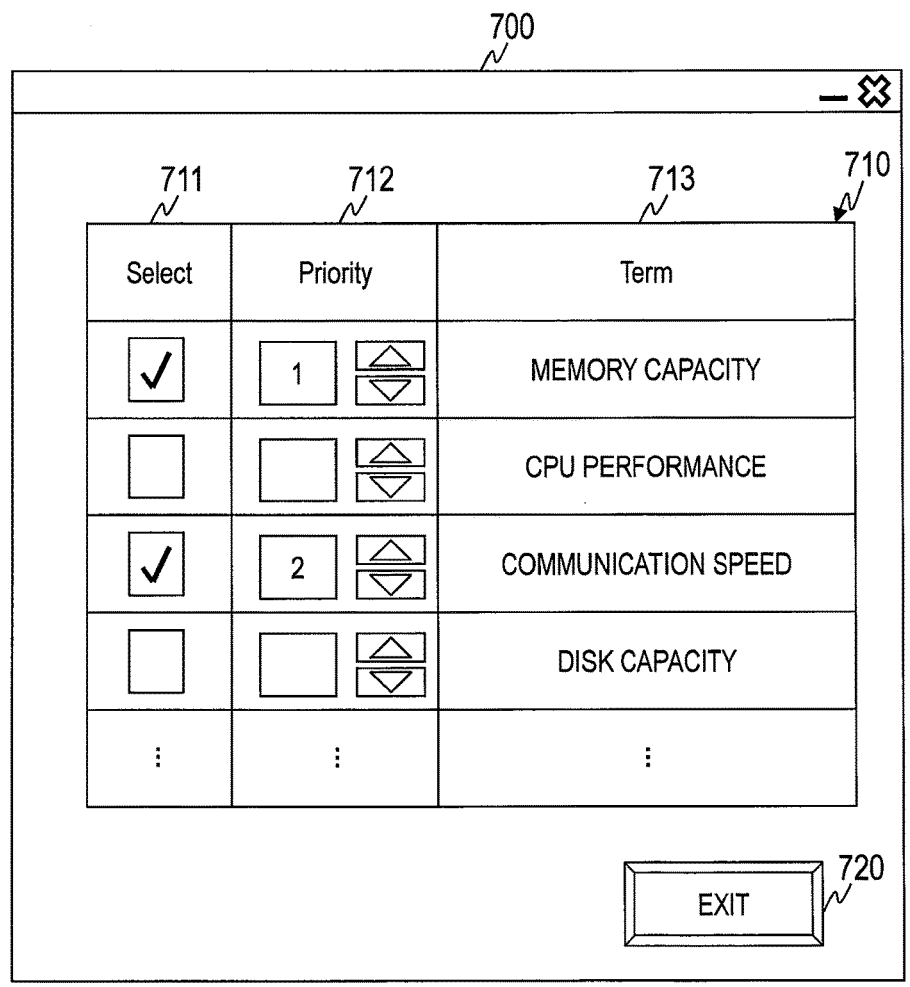
FIG. 7 is an explanatory diagram illustrating an example of an entry screen according to the first embodiment of this invention.

The above-mentioned index information is input with the use of, for example, such an entry screen 700 as illustrated in FIG. 7.

FIG. 7 is an explanatory diagram illustrating an example of the entry screen 700 according to the first embodiment of this invention. It is assumed that the entry screen 700 illustrated in FIG. 7 is displayed on the client 200. It should be noted that the entry screen 700 may be displayed on the server 100 instead.

The entry screen 700 includes a priority level selection area 710 and an "EXIT" operation button 720.

The priority level selection area 710 is a display area for selecting priority levels of indices used to determine the arrangement relationship of the slave servers. The priority level selection area 710 includes a "Select" 711, a "Priority" 712, and a "Term" 713.

The "Select" 711 is a display part for selecting the index to be used. For example, the user operates the "Select" 711 to select its associated index. The "Priority" 712 is a display part for setting the priority level of the selected index. The "Term" 713 is a display part for displaying specific details of the index.

The "EXIT" operation button 720 is an operation button for finishing the operation performed with the use of the entry screen 700. In a case where the user operates the "EXIT" operation button 720, information set in the priority level selection area 710 is transmitted to the server 100.

In the example illustrated in FIG. 7, the memory capacity is selected as an index having the highest priority level and the communication speed is selected as an index having the next highest priority level.

In a case of receiving the request to configure the cluster including the index information, the server 100 stores the received index information on the memory 102.

The description is given now referring back to FIG. 6.

The server 100 collects the performance information on the server 100 itself (Step S101). To be specific, the information sharing part 180 collects the performance information on its own server 100.

The server 100 obtains the performance information on other servers 100 to generate the performance management information 181 based on the obtained performance information (Step S103).

To be specific, the information sharing part 180 receives the performance information transmitted from the other servers 100 to generate the performance management information 181 based on its own collected performance information and the received performance information on the other servers 100. The range rate 603 remains blank at this time.

Further, the information sharing part 180 transmits its own collected performance information to the other servers 100 by multicast transmission.

The server 100 sets all the servers 100 included in the computer system as processing targets and further, sets a value n of the priority level of the index to "1" (Step S105). At this time, the server 100 refers to the index information to identify the index having "1" set as the "Priority" 712.

The server 100 executes, based on the index information and the performance management information 181, arrangement determination processing for determining the arrangement relationship of the slave servers (arrangement of entries of the server 100) (Step S107). Details of the arrangement determination processing are described later with reference to FIG. 8.

The server 100 determines whether or not the arrangement relationship of the slave servers can be uniquely determined as a result of the arrangement determination processing (Step S109). For example, in a case where the arrangement relationship of the slave servers is to be determined based on the memory capacity, it is determined that the arrangement relationship of the slave servers cannot be uniquely determined when there are a plurality of servers 100 having the same memory capacity.

In a case where it is determined that the arrangement relationship of the slave servers (arrangement of entries of the server 100) can be uniquely determined, the server 100 configures the cluster based on the determined arrangement relationship of the slave servers (arrangement of entries of the server 100), and ends the processing (Step S111).

To be specific, the server 100 generates the configuration information 171 based on the arrangement relationship of the slave servers (determined arrangement of entries of the server 100). The generated configuration information 171 is transmitted to the respective servers 100 by the information sharing part 180.

In a case where it is determined that the arrangement relationship of the slave servers (arrangement of entries of the server 100) cannot be uniquely determined, the server 100 refers to the index information to determine whether or not there is an index having the next highest priority level (Step S113). For example, the server 100 refers to the index information to determine whether or not there is information on the index having the value n of the priority level set to "2".

In a case where it is determined that there is no index having the next highest priority level, the server 100 determines the arrangement relationship of the slave servers in accordance with a predetermined standard, and the processing proceeds to Step S111. For example, a method in which the arrangement relationship of the slave servers is determined based on their server IDs is conceivable.

In a case where it is determined that there is an index having the next highest priority level, the server 100 sets only the server 100 for which the arrangement relationship of the slave servers (arrangement of entries of the server 100) is not uniquely determined as the processing targets, and further, sets a value obtained by incrementing the value n by "1" as the value n of the priority level (Step S115). The processing then returns to Step S107.

In this manner, the server 100 can execute the arrangement determination processing only on the server 100 for which the arrangement relationship of the slave servers (arrangement of entries of the server 100) is not uniquely determined.

It should be noted that the server 100 holds the same performance management information 181, and hence in normal cases, the same configuration information 171 is generated as the processing result. However, in a case where the configuration information 171 differs from one to another, the following method is conceivable. Specifically, the server 100 counts the number of pieces of configuration information 171 received from the other servers 100 for each set of pieces of configuration information 171 having the same contents, and of the sets of pieces of configuration information 171 each having the same contents, preferentially selects one having the largest count.

A description is now given of algorithms applied in this embodiment to the arrangement relationship of the slave servers (arrangement of entries of the server 100). It is assumed in the following description that the memory capacity is selected as the index having a priority level of "1". Further, in the following description, a server A having a memory capacity of "3 GB", a server B having a memory capacity of "2 GB", a server C having a memory capacity of "3 GB", a server D having a memory capacity of "1 GB", a server E having a memory capacity of "4 GB", and a server F having a memory capacity of "2 GB" are taken as an example.

In this embodiment, two algorithms of a "down staircase" algorithm and an "inverted V shape" algorithm are used.

Figure 8:
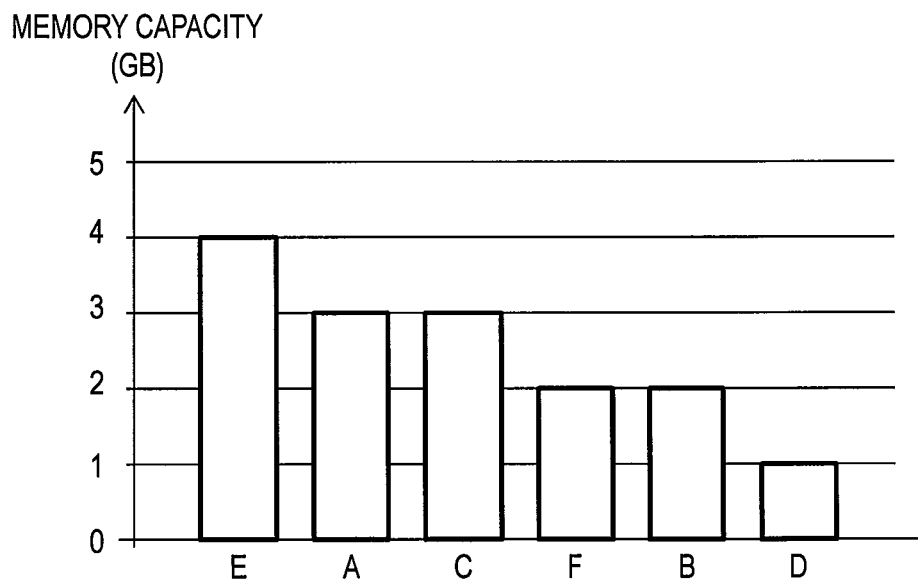
FIG. 8 is an explanatory diagram showing an example of a "down staircase" algorithm according to the first embodiment of this invention.

FIG. 8 is an explanatory diagram showing an example of the "down staircase" algorithm according to the first embodiment of this invention.

In the "down staircase" algorithm, the entries of the servers 100 are arranged in descending order of their performances (in descending order of their memory capacities). In this embodiment, the entries are arranged so that the difference in performance between a given server 100 and its neighboring server 100 (server 100 arranged on the right or left side) becomes smaller.

In the example shown in FIG. 8, the entries of the servers 100 are arranged in descending order of their memory capacities from a left side of FIG. 8. To be specific, the entries are arranged from the left side in the order of the server E, the server A, the server C, the server F, the server B, and the server D. The server 100 arranged on the right side of the entry of a given server is the slave server for holding the plurality of pieces of replicated data of the plurality of pieces of master data managed by the given server 100 corresponding to the entry. Moreover, the server 100 arranged on the left side of the entry of a given server is the master server for holding the plurality of pieces of master data of the plurality of pieces of replicated data held by the given server 100 corresponding to the entry.

With this arrangement, the difference in memory capacity from the server 100 arranged on the right side becomes smaller, and hence the access performance in the entire KVS is enhanced greatly.

The "down staircase" algorithm is an algorithm that takes into consideration the performance of a first server 100 and the performance of a second server 100 for holding the plurality of pieces of replicated data of the plurality of pieces of master data managed by the first server 100.

More generally, when the memory capacities of the servers 100 having identifiers of i and j are defined as M[i] and M[j], respectively, the combination of the servers 100 that minimizes a value of the following Expression (1) corresponds to the "down staircase" algorithm. It should be noted that a condition that the performance of the server 100 holding the plurality of pieces of master data is equal to or higher than the performance of the server 100 holding the plurality of pieces of replicated data is given as a condition for the arrangement. However, every pair of the servers 100 does not need to satisfy this condition.

[Expression (1)]

$$\sum_{i,j=1}^{n} |M(i) - M(j)| \qquad (1)$$

In this case, $i \neq j$

In this case, the server 100 having the identifier of j is the slave server for holding the plurality of pieces of replicated data of the server 100 having the identifier of i.

Figure 9:
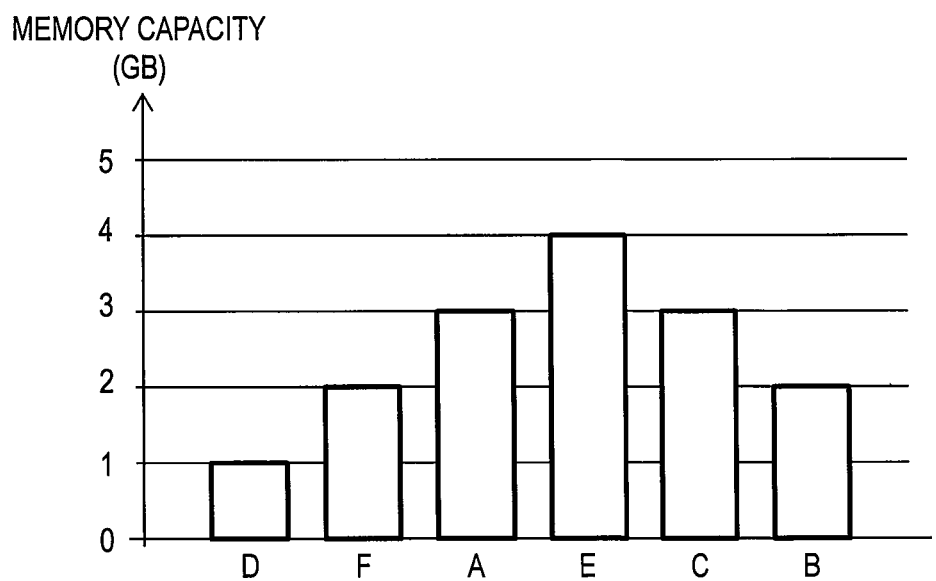
FIG. 9 is an explanatory diagram showing an example of an "inverted V shape" algorithm according to the first embodiment of this invention.

FIG. 9 is an explanatory diagram showing an example of the "inverted V shape" algorithm according to the first embodiment of this invention.

In the "inverted V shape" algorithm, the entries of the servers 100 are arranged so that the arranged entries have an inverted V shape with the entry of the server 100 having the highest performance (having the largest memory capacity) as its center. In this embodiment, the entries are arranged so that the difference in performance between a given server 100 and the servers 100 arranged on both sides of the given server 100 becomes smaller. The server 100 arranged on the right side of the entry of a given server is the slave server for holding the plurality of pieces of replicated data of the plurality of pieces of master data managed by the given server 100 corresponding to the entry. Moreover, the server 100 arranged on the left side of the entry of a given server is the master server for holding the plurality of pieces of master data of the plurality of pieces of replicated data held by the given server 100 corresponding to the entry.

In the example shown in FIG. 9, the entries of the servers 100 are arranged so that the arranged entries have an inverted V shape with the server 100 having the largest memory capacity as its center. To be specific, the entries are arranged from the left side in the order of the server D, the server F, the server A, the server E, the server C, and the server B.

With this arrangement, the difference in memory capacity from the servers 100 arranged on both sides becomes smaller, and the memory usage efficiency is enhanced as well. This is because the difference in memory capacity from the servers arranged on both sides is small and the plurality of pieces of replicated data can thus be efficiently stored.

The "inverted V shape" algorithm is an algorithm that takes into consideration the performance of a first server 100, the performance of a second server 100 for holding the plurality of pieces of replicated data of the plurality of pieces of master data managed by the first server 100, and the performance of a third server 100 for managing the plurality of pieces of master data of the plurality of pieces of replicated data held by the first server 100.

More generally, when the memory capacities of the servers 100 having identifiers of i, j, and k are defined as M[i], M[j], and M[k], respectively, the combination of the servers 100 that minimizes a value of the following Expression (2) corresponds to the "inverted V shape" algorithm.

[Expression (2)]

$$\sum_{i,j,k=1}^{n} (|M(i) - M(j)| + |M(j) - M(k)|) \quad (2)$$

In this case, $i \neq j \neq k$

In this case, the server 100 having the identifier of k is the slave server for holding the plurality of pieces of replicated data of the server 100 having the identifier of j. Further, the server 100 having the identifier of j is the slave server for holding the plurality of pieces of replicated data of the server 100 having the identifier of i.

In this embodiment, based on a ratio of the performances of the servers 100, the widths of the management ranges to be assigned to the respective servers 100 are determined. With this configuration, it is possible to enhance the access performance and also enhance the memory usage efficiency as well.

In the "down staircase" algorithm, the difference in performance (memory capacity) from the server 100 arranged on the right side is small, and hence the difference in size between the plurality of pieces of replicated data can also be made small. It is accordingly possible to store all of the plurality of pieces of replicated data in the memory store 140. Therefore, access processing required by the client can be dealt with only with the use of the memory store 140.

In the "down staircase" algorithm, however, the server 100 having the largest memory capacity stores the plurality of pieces of replicated data of the server having the smallest memory capacity, and hence the memory usage efficiency becomes low in some cases.

In the "inverted V shape" algorithm, on the other hand, the difference in performance (memory capacity) from the servers 100 arranged on both sides is small, and hence such a problem that arises in the "down staircase" algorithm does not occur. However, as compared with the "down staircase" algorithm, the difference in performance between the servers 100 becomes large, and hence the plurality of pieces of replicated data is stored in the disk store 130 in some cases. In this case, the access performance becomes lower than that of the "down staircase" algorithm.

In this embodiment, the server 100 switches the above-mentioned two algorithms from one to another based on the performance (index) designated by the user. Specifically, the server 100 applies the "down staircase" algorithm when a high access performance is required, and the server 100 applies the "inverted V shape" algorithm when the access performance and the memory usage efficiency are required.

In the following description, the arrangement of the entries of the servers 100 to which the "down staircase" algorithm is applied is referred to as "'down staircase' arrangement" and the arrangement of the entries of the servers 100 to which the "inverted V shape" algorithm is applied is referred to as "'inverted V shape' arrangement".

Figure 10:
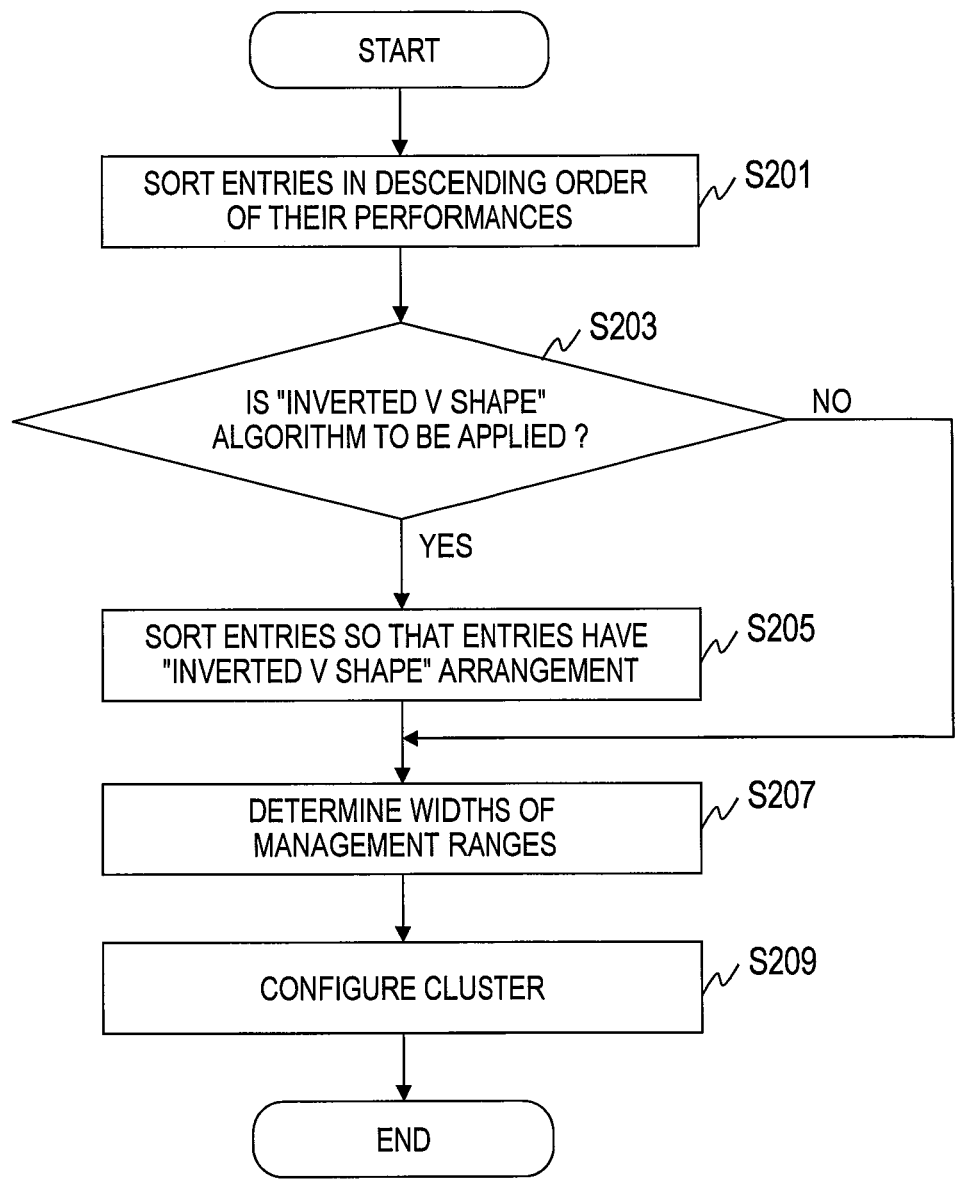
FIG. 10 is a flow chart illustrating details of arrangement determination processing according to the first embodiment of this invention.

FIG. 10 is a flow chart illustrating details of arrangement determination processing according to the first embodiment of this invention. The arrangement determination processing is executed by the arrangement management part 160.

The arrangement management part 160 sorts the entries of the performance management information 181 in descending order of their performances (Step S201). In other words, the entries are sorted to have the "down staircase" arrangement.

To be specific, the arrangement management part 160 identifies the index corresponding to the value n of the index information. The arrangement management part 160 compares the performances of the respective servers 100 with one another based on the identified index to sort the entries of the servers 100 from the left side in descending order of their performances.

It should be noted that, in a case where there are entries having the same value of the index that is currently used, the arrangement management part 160 compares the performances corresponding to another index to sort the entries (Steps S113 and S115). In a case where there is no index to be used, the arrangement management part 160 sorts the entries based on their server IDs.

The arrangement management part 160 next determines whether or not the "inverted V shape" algorithm is to be applied (Step S203). To be specific, the following processing is executed.

The arrangement management part 160 refers to the index information to determine whether or not the memory capacity and the communication speed are selected as the indices to be used.

In a case where the memory capacity and the communication speed are selected as the indices to be used, the arrangement management part 160 determines that the "inverted V shape" algorithm is to be applied.

It should be noted that only one of the memory capacity and the communication speed is selected as the index to be used, the arrangement management part 160 determines that the "inverted V shape" algorithm is not to be applied.

In a case where it is determined that the "inverted V shape" algorithm is not to be applied, in other words, in a case where it is determined that the "down staircase" algorithm is to be applied, the processing of the arrangement management part 160 proceeds to Step S207.

In this case, in Step S203, the entries of the performance management information 181 are sorted to have the "down staircase" arrangement, and hence the order of the entries of the performance management information 181 is not changed.

In a case where it is determined that the "inverted V shape" algorithm is to be applied, the arrangement management part 160 sorts the entries of the performance management information 181 so that the entries have the "inverted V shape" arrangement based on the performances corresponding to the index (Step S205). The following method is conceivable as a method of sorting the entries so that the entries have the "inverted V shape" arrangement, for example.

The arrangement management part 160 first determines a position of a first entry corresponding to the server 100 having the highest performance. For example, a method of arranging the first entry to the center of the performance management information 181 is conceivable.

The arrangement management part 160 retrieves a second entry corresponding to the server 100 having the next highest performance, and arranges the retrieved second entry on the left side of the first entry. The arrangement management part 160 retrieves a third entry corresponding to the server 100 having the next highest performance, and arranges the retrieved third entry on the right side of the first entry. Subsequently, the arrangement management part 160 arranges even-ordered entries on the left side of the first entry in order and arranges odd-ordered entries on the right side of the first entry in order.

The arrangement management part 160 can sort the entries of the performance management information 181 so that the entries have the "inverted V shape" arrangement by executing the above-mentioned procedure on all the entries.

It should be noted that the above-mentioned arrangement method is merely an example, and this invention is not limited thereto. Any method can be adopted as long as the entries can be arranged so that the difference in performance from the servers 100 arranged on both sides becomes smaller.

The arrangement management part 160 determines the widths of the management ranges to be assigned to the respective servers 100 based on the performance management information 181 (Step S207).

For example, a method of determining the widths of the management ranges of the respective servers 100 based on the ratio of the memory capacities is conceivable.

The arrangement management part 160 configures the cluster based on the processing result, and ends the processing (Step S209). To be specific, the following processing is executed.

The arrangement management part 160 sets the slave servers to the respective servers 100 based on the order of the entries of the performance management information 181. In this embodiment, the server 100 corresponding to the entry arranged on the right side of a predetermined entry is set as the slave server.

Further, the arrangement management part 160 applies a distributed algorithm based on the determined widths of the management ranges to determine the management ranges to be assigned to the respective servers 100.

It should be noted that, in the arrangement determination processing, the order of the processing may be modified as long as the consistency of the processing can be maintained. For example, the arrangement management part 160 may execute the processing of Step S203, and then execute the processing of Step S201 in a case where the "inverted V shape" algorithm is not to be applied, and execute the processing of Step S205 in a case where the "inverted V shape" algorithm is to be applied.

Further, the arrangement management part 160 generates the configuration information 171 based on the widths of the management ranges to be assigned to the respective servers 100 and the determined arrangement relationship of the slave servers. The generated configuration information 171 is output to the configuration information management part 170.

Now, a description is given of the embodiment of this invention by way of specific example.

It is assumed in the following example that the memory capacity is selected as the index. It is also assumed that the computer system includes the server A, the server B, the server C, the server D, and the server E. It is further assumed that the memory capacities of the server A, the server B, the server C, the server D, and the server E are "3 GB", "2 GB", "3 GB", "1 GB", and "4 GB", respectively.

Referring to FIGS. 11A, 11B, and 11C, a description is first given of a specific example of the arrangement determination processing in a case where the "down staircase" algorithm is applied. It should be noted that, in order to simplify the description, only the memory capacity is shown as the specifications 602.

In Step S201, the arrangement management part 160 sorts the entries of the performance management information 181 so that the entries have the "down staircase" arrangement based on their memory capacities. As the result of this sorting, the entries of the performance management information 181 are sorted as shown in a change of the arrangement from FIG. 11A to FIG. 11B.

In this case, the server A and the server C have the same memory capacity, and hence the arrangement management part 160 sorts the entries of the server A and the server C in the alphabetical order of their server IDs.

In Step S207, the arrangement management part 160 determines the widths of the management ranges to be assigned to the respective servers 100 based on their memory capacities.

To be specific, the arrangement management part 160 calculates a total value of the memory capacities of all the entries. In the example shown in FIG. 11B, the total value is calculated as "13 GB". The arrangement management part 160 next sets the total value as a denominator of a fraction and sets the value of the memory capacity of a given entry as a numerator of the fraction. The fraction is a value indicating a ratio of the management range of the given entry within a data range.

As the result of the processing of Step S207, the performance management information 181 is updated as shown in FIG. 11C.

In Step S209, the arrangement management part 160 determines the management ranges to be assigned to the respective servers 100, and further, sets the server 100 for holding the plurality of pieces of replicated data, thereby configuring the cluster. To be specific, the following processing is executed.

The arrangement management part 160 divides the entire data range into equal thirteen pieces, and determines the widths of the management ranges of the server E, the server A, the server C, the server B, and the server D so that the determined widths have a ratio of "4:3:3:2:1". The arrangement management part 160 applies the distributed algorithm based on the determined widths of the management ranges, to thereby determine the hash values of the management ranges of the servers.

Further, the arrangement management part 160 makes settings so that the server A, the server C, the server B, the server D, and the server E have the plurality of pieces of replicated data of the server E, the plurality of pieces of replicated data of the server A, the plurality of pieces of replicated data of the server C, the plurality of pieces of replicated data of the server B, and the plurality of pieces of replicated data of the server D, respectively.

With the processing described above, it is possible to generate the configuration information 171.

Figure 12A:
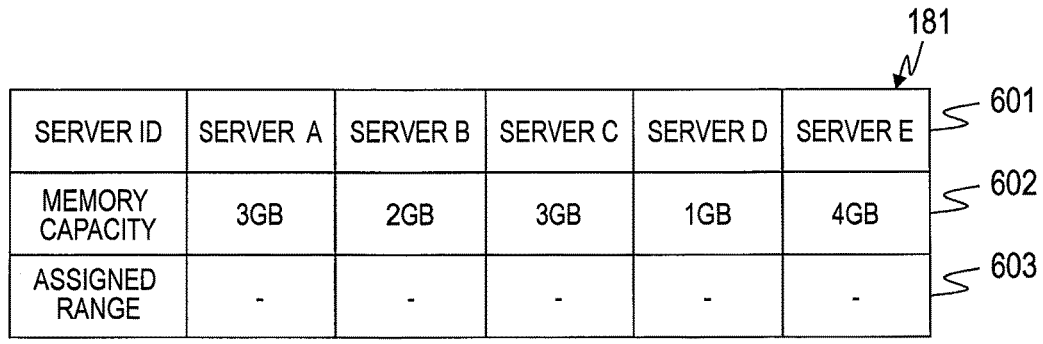
FIGS. 12A, 12B, and 12C are explanatory diagrams showing a specific example of the arrangement determination processing.
Figure 12B:
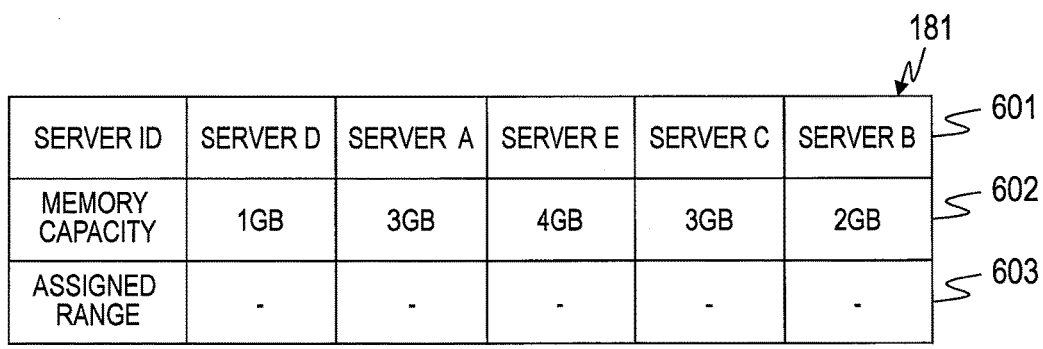
Figure 12C:
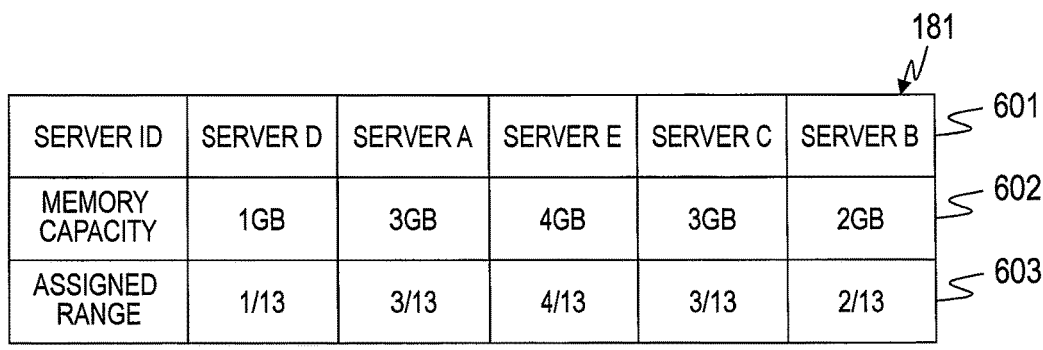

Referring to FIGS. 12A, 12B, and 12C, a description is next given of a specific example of the arrangement determination processing in a case where the "inverted V shape" algorithm is applied.

In Step S201, the arrangement management part 160 sorts the entries of the performance management information 181 so that the entries have the "down staircase" arrangement based on their memory capacities. As the result of this sorting, the entries of the performance management information 181 are sorted as shown in a change of the arrangement from FIG. 12A to FIG. 11B.

In Step S205, the arrangement management part 160 sorts the entries of the performance management information 181 so that the entries have the "inverted V shape" arrangement. As the result of this sorting, the entries of the performance management information 181 are sorted as shown in FIG. 12B.

In Step S207, the arrangement management part 160 determines the widths of the management ranges to be assigned to the respective servers 100 based on their memory capacities. As a method of determining the widths of the management ranges, the same method as that used in the case of the "down staircase" algorithm is used.

As the result of the processing of Step S207, the performance management information 181 is updated as shown in FIG. 12C.

In Step S209, the arrangement management part 160 determines the management ranges to be assigned to the respective servers 100, and further, sets the server 100 for holding the plurality of pieces of replicated data, thereby configuring the cluster. To be specific, the following processing is executed.

The arrangement management part 160 divides the entire data range into equal thirteen pieces, and determines the widths of the management ranges of the server D, the server A, the server E, the server C, and the server B so that the determined widths have a ratio of "1:3:4:3:2". The arrangement management part 160 applies the distributed algorithm based on the determined widths of the management ranges, to thereby determine the hash values of the management ranges of the servers.

Further, the arrangement management part 160 makes settings so that the server A, the server E, the server C, the server B, and the server D have the replicated data of the server D, the plurality of pieces of replicated data of the server A, the plurality of pieces of replicated data of the server E, the plurality of pieces of replicated data of the server C, and the plurality of pieces of replicated data of the server B, respectively.

With the processing described above, it is possible to generate the configuration information 171.

In a case where the arrangement determination processing is finished, the arrangement management part 160 of this embodiment further generates display information for displaying the result of the arrangement determination processing, and generates a confirmation screen on the server 100 or the client 200.

FIGS. 13A and 13B are each an explanatory diagram illustrating an example of a confirmation screen 900 according to the first embodiment of this invention.

FIG. 13A illustrates the confirmation screen 900 for displaying a result of the arrangement determination processing to which the "down staircase" algorithm is applied. FIG. 13B illustrates the confirmation screen 900 for displaying a result of the arrangement determination processing to which the "inverted V shape" algorithm is applied.

The confirmation screen 900 displays a server ID 911, a "Position" 912, a memory capacity 913, a processor 914, and a communication speed 915.

The server ID 911 displays an identifier for uniquely identifying the server 100. The "Position" 912 displays information indicating the width of the management range assigned to the server 100. It is assumed in this embodiment that a plurality of pieces of data corresponding to the determined width of the management range is assigned from a head of the data range. It should be noted that the "Position" 912 may alternatively display a value indicating the management range.

The memory capacity 913 displays information on the capacity of the memory 102 of the server 100 corresponding to the server ID 911. In this embodiment, the "down staircase" algorithm using the memory capacity as its index is applied, and hence in the memory capacity 913, icons indicating that the entries are arranged to have the "down staircase" arrangement.

The processor 914 displays information on the performance of the processor 101 of the server 100 corresponding to the server ID 911. The communication speed 915 displays information on the performance of the network interface of the server 100 corresponding to the server ID 911.

It should be noted that the information displayed on the confirmation screen 900 is merely an example, and the confirmation screen 900 may also display the capacity of the storage apparatus 105, a usage rate of the processor 101, a load of the processor 101, and the like.

It should be noted that, in this embodiment, the case where a single slave server is selected for a single piece of master data has been described, but similar algorithms can be applied even in a case where a plurality of slave servers are selected for a single piece of master data.

For example, a case where two slave servers are selected for a single piece of master data is assumed. In this case, in any of the cases of the "down staircase" algorithm and the "inverted V shape" algorithm, after one slave server is determined, the same arrangement determination processing only needs to be performed assuming the determined slave server as the master server.

Modified Example

In the "inverted V shape" algorithm, there is also a method of sorting the entries so that the entries have the "inverted V shape" arrangement having a different shape based on the priority levels of an access speed and the memory usage efficiency. Now, a description is given of the processing of Step S205 according to a modified example of the first embodiment.

Figure 14:
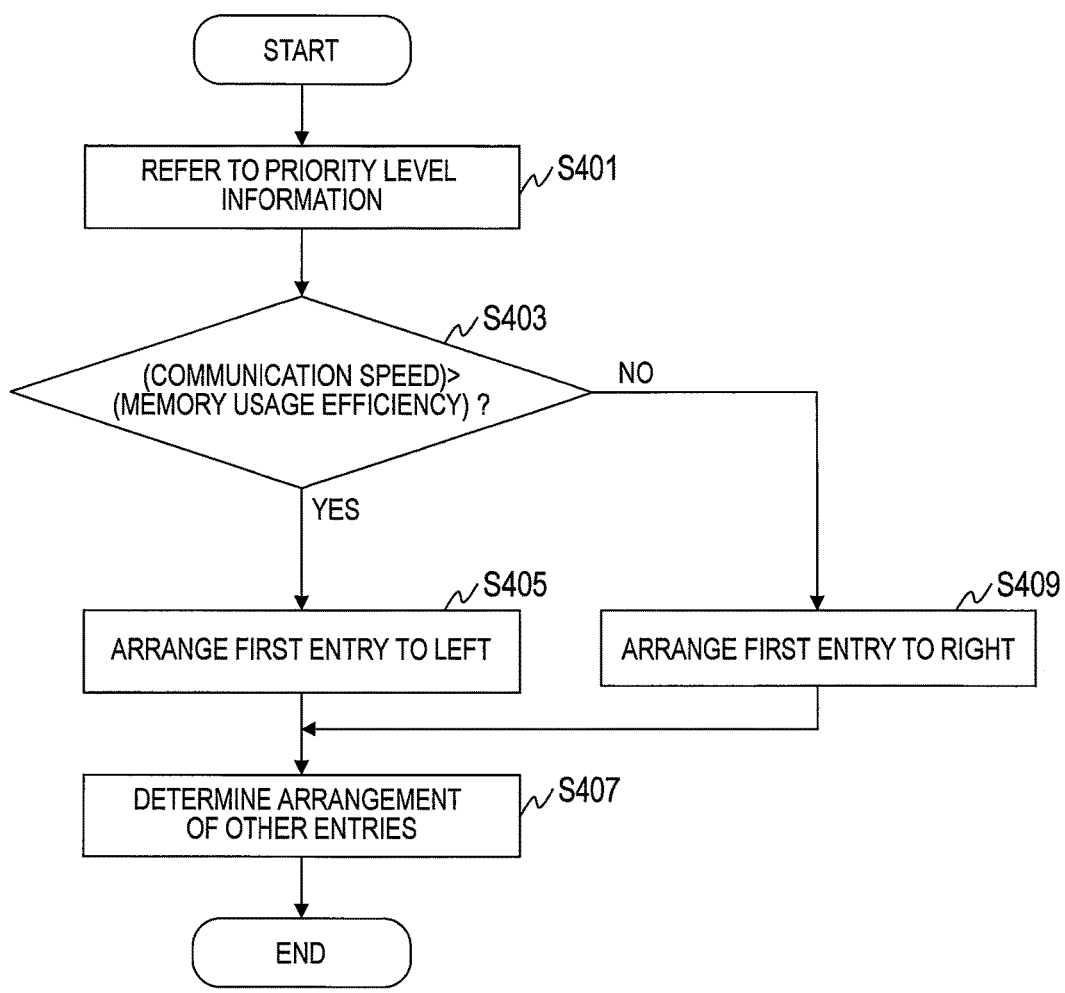
FIG. 14 is a flow chart illustrating "inverted V shape" arrangement processing according to a modified example of the first embodiment of this invention.

FIG. 14 is a flow chart illustrating "inverted V shape" arrangement processing according to the modified example of the first embodiment of this invention.

The arrangement management part 160 refers to the index information to compare the priority level of the access speed with the priority level of the memory capacity (Step S401).

The arrangement management part 160 determines whether or not the priority level of the access speed is higher than the priority level of the memory capacity as a result of the comparison (Step S403). In other words, it is determined whether or not more importance is placed on the communication speed than the memory capacity.

In a case where it is determined that the priority level of the access speed is higher than the priority level of the memory capacity, the arrangement management part 160 determines a position shifted to the left side by a predetermined range from the center of the performance management information 181 as an arrangement position of the first entry in the performance management information 181 (Step S405). For example, a method of arranging the first entry at the position shifted to the left side by a distance corresponding to three entries is conceivable. It should be noted that the first entry corresponds to the server 100 having the largest performance.

In a case where it is determined that the priority level of the access speed is lower than the priority level of the memory capacity, the arrangement management part 160 determines a position shifted to the right side by a predetermined range from the center of the performance management information 181 as an arrangement position of the first entry in the performance management information 181 (Step S409), and the processing proceeds to Step S407. For example, a method of arranging the first entry at the position shifted to the right side by the distance corresponding to three entries is conceivable.

The arrangement management part 160 determines the arrangement of other entries including the second entry (Step S407), and ends the processing. A method of determining the arrangement of the other entries including the second entry is the same as that of the first embodiment.

Second Embodiment

In a second embodiment of this invention, a description is given of processing performed when the server 100 is added or removed during the operation of the cluster. The following description focuses mainly on a difference from the first embodiment.

The configuration of the computer system and the configurations of the server 100 and the client 200 are the same as those of the first embodiment, and hence their descriptions are omitted.

Figure 15:
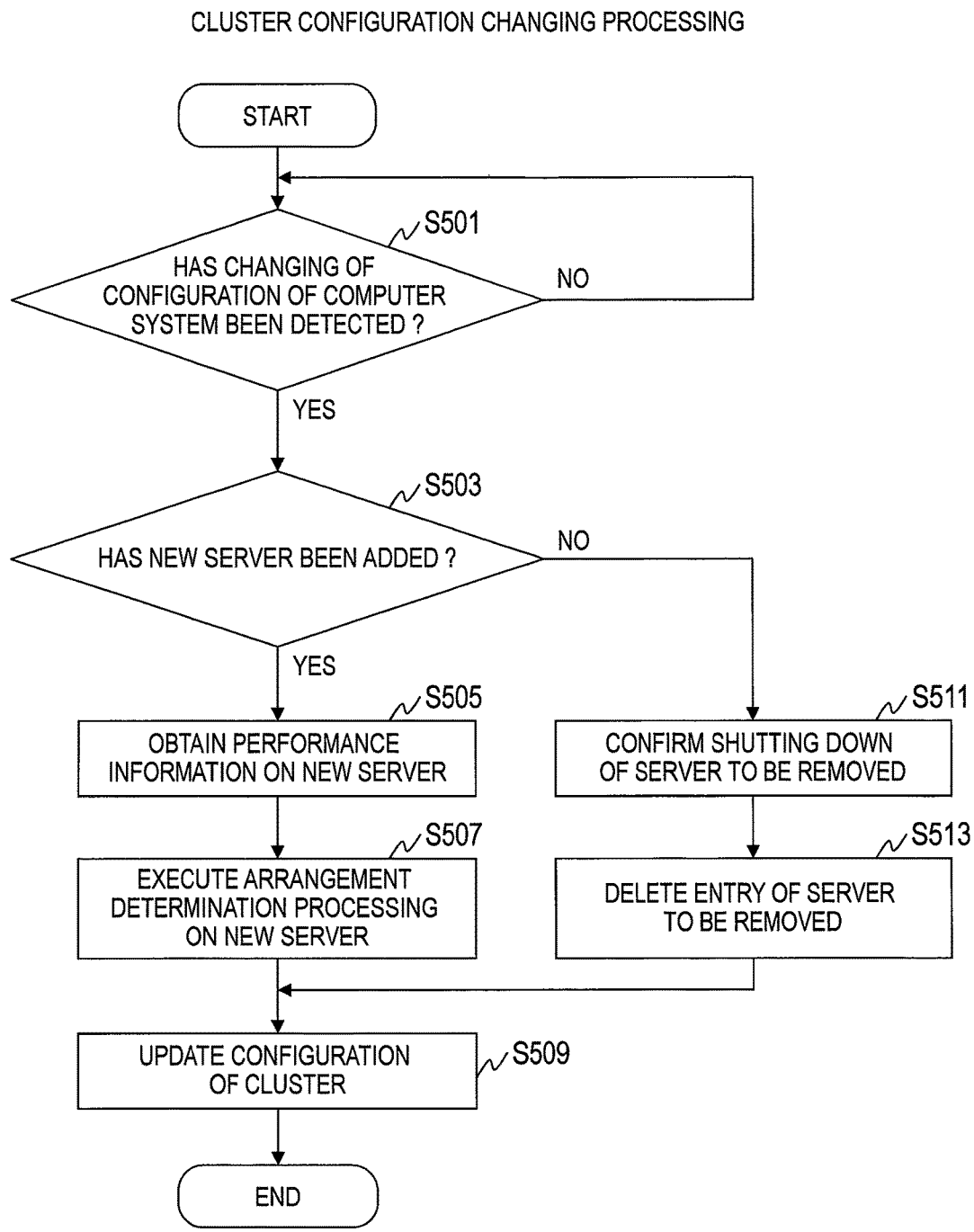
FIG. 15 is a flow chart illustrating cluster configuration changing processing according to the second embodiment of this invention.

FIG. 15 is a flow chart illustrating cluster configuration changing processing according to the second embodiment of this invention.

The server 100 determines whether or not the changing of the configuration of the computer system has been detected (Step S501). For example, in a case of receiving an instruction to add or remove the server 100 from the client 200, the server 100 determines that the changing of the configuration of the computer system has been detected.

In a case where it is determined that the changing of the configuration of the computer system has not been detected, the processing of the server 100 returns to Step S501, and the server 100 waits until the configuration of the computer system is changed.

In a case where it is determined that the changing of the configuration of the computer system has been detected, the server 100 determines whether or not a new server 100 has been added (Step S503).

In a case where it is determined that the new server 100 has been added, the server 100 obtains the performance information on the new server 100, and executes the arrangement determination processing on the new server 100 (Steps S505 and S507).

At this time, the server 100 executes the arrangement determination processing based on the obtained performance information on the new server 100, to thereby update the performance management information 181. To be specific, the performance management information 181 adds an entry corresponding to the new server 100. Specific details of the arrangement determination processing are described later with reference to FIGS. 16A and 16B.

The server 100 updates the configuration of the cluster, and ends the processing (Step S509). To be specific, the server 100 updates the configuration information 171 based on the updated performance management information 181.

In a case where it is determined in Step S503 that the new server 100 has not been added, in other words, it is determined that the server 100 has been removed, the server 100 confirms shutting down of the server 100 to be removed (Step S511). To be specific, the information sharing part 180 detects the shutting down of the server 100 to be removed.

The server 100 deletes an entry corresponding to the server 100 to be removed from the performance management information 181 (Step S513).

The server 100 updates the configuration of the cluster, and ends the processing to an end (Step S509).

Figure 16A:
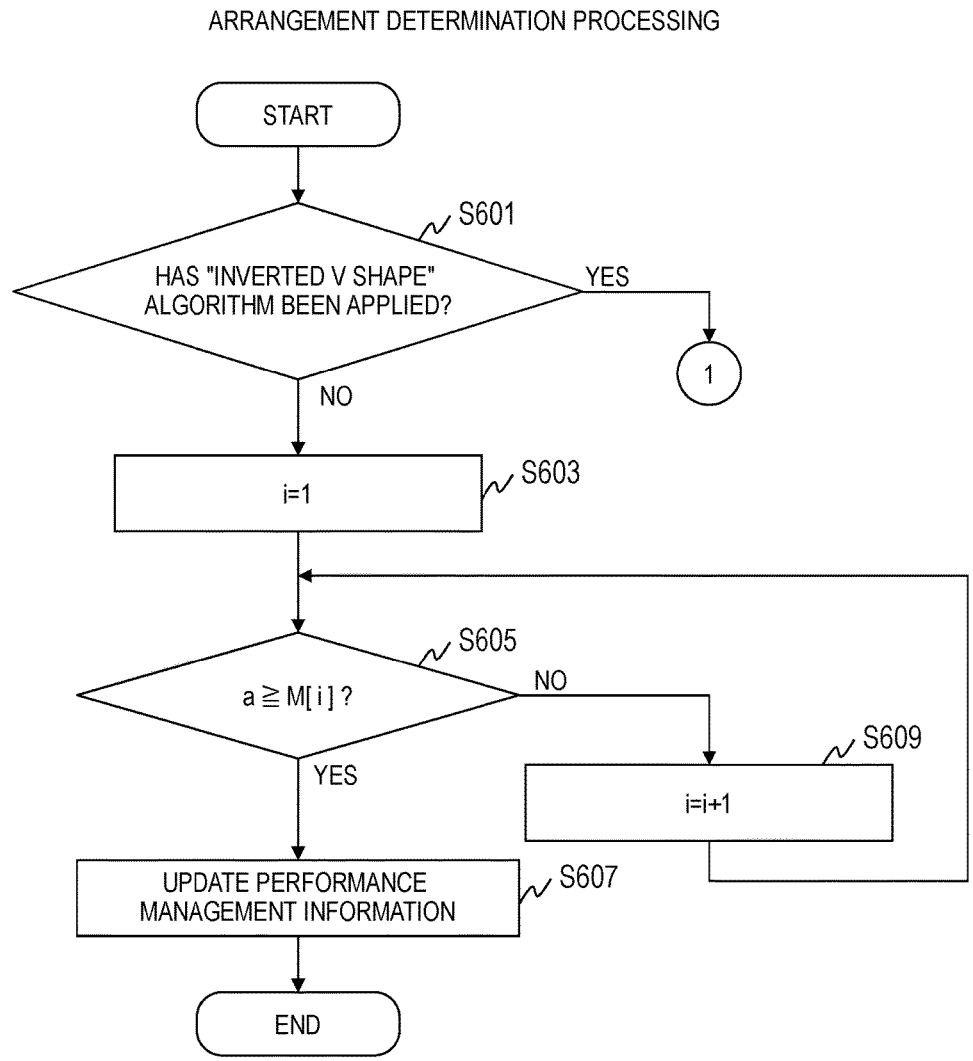
FIGS. 16A and 16B are flow charts illustrating arrangement determination processing for a new server according to the second embodiment of this invention.
Figure 16B:
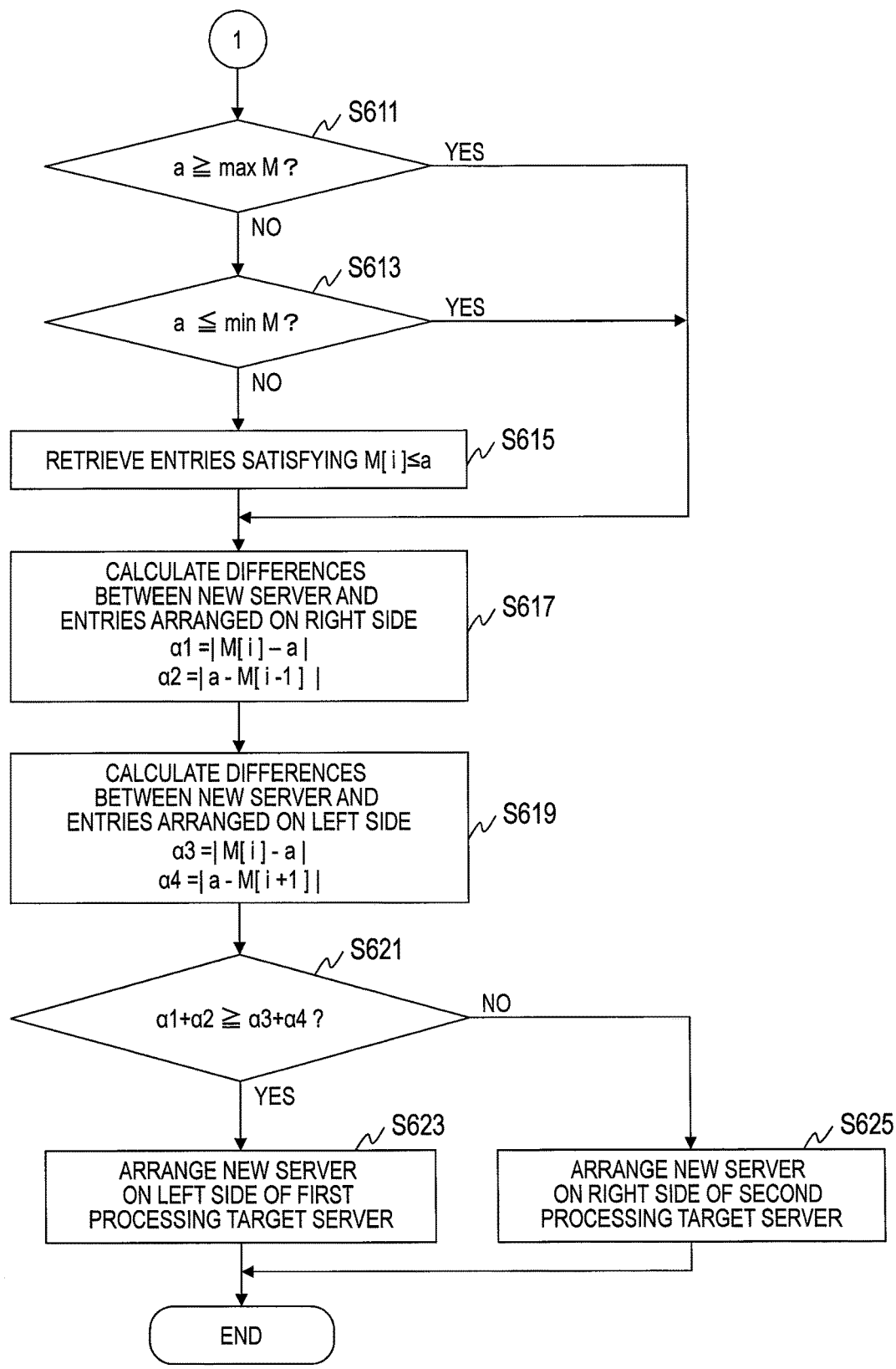

FIGS. 16A and 16B are flow charts illustrating arrangement determination processing for the new server 100 according to the second embodiment of this invention.

It is assumed in the following description that the entries of the performance management information 181 are each assigned with an identification number i ranging from "1" to "n" from the left side. Further, the memory capacity of an i-th entry is represented by "M[i]" and the memory capacity of the new server 100 is represented by "a".

The arrangement management part 160 refers to the performance management information 181 to determine whether or not the "inverted V shape" algorithm has been applied to the arrangement of the performance management information 181 (Step S601).

In a case where it is determined that the "inverted V shape" algorithm has not been applied to the arrangement of the performance management information 181, in other words, the "down staircase" algorithm has been applied to the arrangement of the performance management information 181, the arrangement management part 160 sets the identification number i to "1" (Step S603).

The arrangement management part 160 next determines whether or not the memory capacity of the new server 100 is equal to or larger than the memory capacity of the server 100 corresponding to the i-th entry (Step S605).

In a case where the condition of Step S605 is not satisfied, the arrangement management part 160 adds "1" to the identification number i (Step S609), and the processing returns to Step S605. The arrangement management part 160 then executes similar processing.

In a case where it is determined that the condition of Step S605 is satisfied, the arrangement management part 160 determines a position of the entry of the new server 100 in the arrangement of the entries to update the performance management information (Step S607).

To be specific, the arrangement management part 160 adds the entry of the new server 100 on the left side of the server 100 having the memory capacity M[i], to thereby update the performance management information 181. Now, a description is given of an example of a method of updating the performance management information 181.

Figure 17:
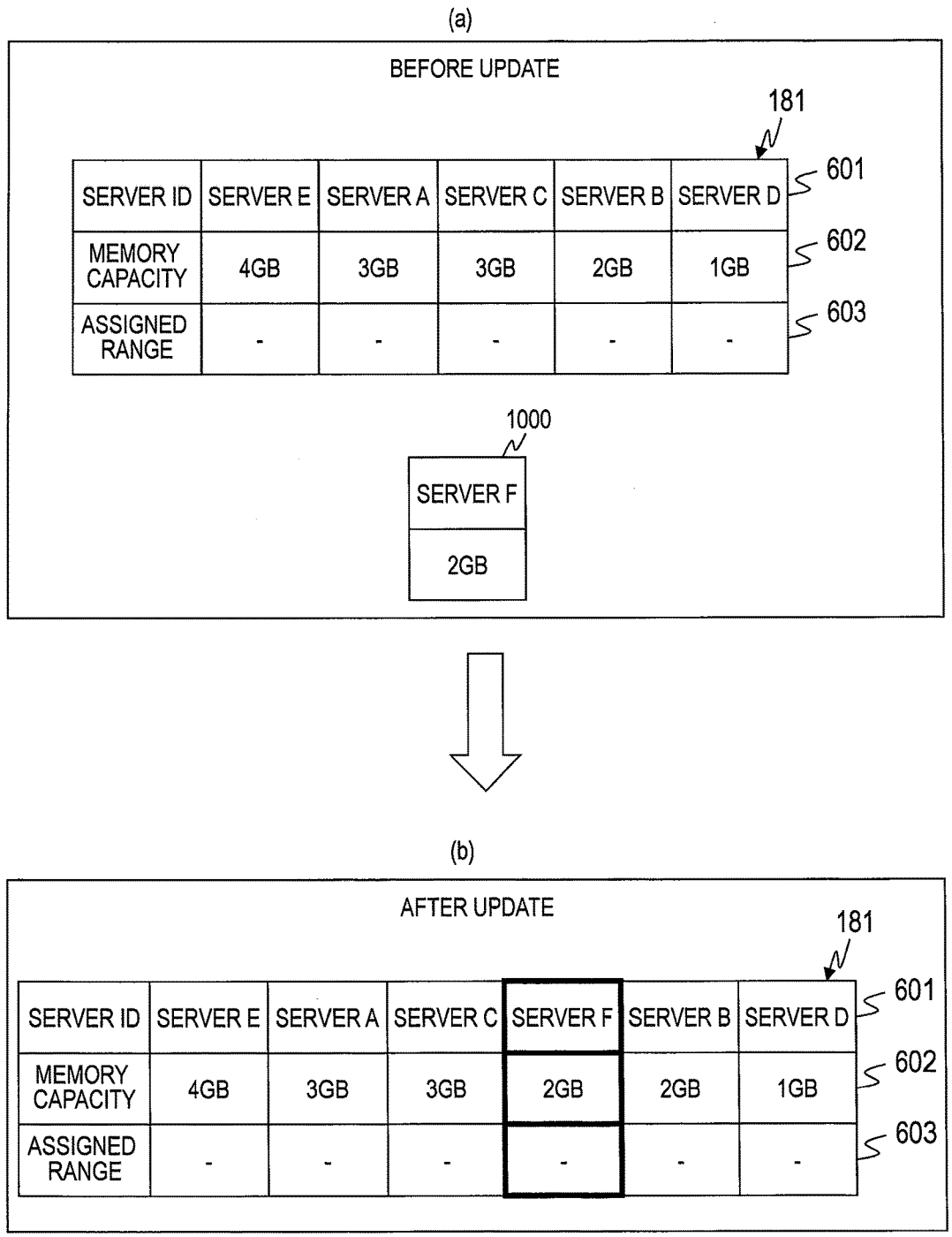
FIG. 17 is an explanatory diagram showing one example of a method of updating the performance management information according to the second embodiment of this invention.

FIG. 17 is an explanatory diagram showing one example of the method of updating the performance management information 181 according to the second embodiment of this invention.

Part (a) of FIG. 17 shows the performance management information 181 before update. Part (b) of FIG. 17 shows the performance management information 181 after the update.

It is assumed here that the server ID of the new server 100 is "Server F" and its memory capacity is "2 GB". In this case, the arrangement management part 160 executes comparison processing on the respective entries of the performance management information 181 based on performance information 1000 having such a format as shown in part (a) of FIG. 17.

In Steps S605 and S607, as a result of the processing of comparison between the new server F and the server E, it is determined that the condition of Step S605 is not satisfied. The comparison between the server A and the server C also generates a similar result. As a result of the processing of comparison with the server B, the condition of Step S605 is satisfied, and hence the arrangement management part 160 determines a position on the left side of the server B as the position of the entry of the new server F. As a result, the performance management information 181 is updated as shown in part (b) of FIG. 17.

It should be noted that the method of adding the new server 100 in the "down staircase" algorithm illustrated in FIG. 16A is merely an example, and for example, a method in which the comparison with the servers 100 is performed in ascending order of their memory capacities may be adopted.

The description is given now referring back to FIGS. 16A and 16B.

In a case where it is determined in Step S601 that the "inverted V shape" algorithm has been applied to the arrangement of the performance management information 181, the arrangement management part 160 determines whether or not the memory capacity of the new server 100 is equal to or larger than the largest value of the memory capacities in the computer system (Step S611).

In a case where it is determined that the condition of Step S611 is not satisfied, the arrangement management part 160 determines whether or not the memory capacity of the new server 100 is equal to or smaller than the smallest value of the memory capacities in the computer system (Step S613).

In a case where it is determined that the condition of Step S613 is not satisfied, the arrangement management part 160 retrieves, with the peak of the "inverted V shape" arrangement as the start of retrieval, the server 100 whose memory capacity is equal to or smaller than that of the memory of the new server 100 (Step S615). The retrieved server 100 is referred to as "processing target server 100".

It should be noted that, in the "inverted V shape" algorithm, there are two entries that satisfy the condition of Step S615, which include the one arranged on the right side of the peak of the "inverted V shape" arrangement and the one arranged on the left side thereof. Accordingly, the processing target server 100 arranged on the right side of the peak is referred to as "first processing target server 100" and the processing target server 100 arranged on the left side of the peak is referred to as "second processing target server 100".

The arrangement management part 160 calculates a difference in memory capacity between the first processing target server 100 and the new server 100 (first memory difference) and a difference in memory capacity between the new server 100 and the server 100 arranged immediately on the left side of the first processing target server 100 (second memory difference) (Step S617). In this step, the arrangement management part 160 calculates an absolute value of the difference in memory capacity between the respective servers 100.

Further, the arrangement management part 160 calculates a difference in memory capacity between the second processing target server 100 and the new server 100 (third memory difference) and a difference in memory capacity between the new server 100 and the server 100 arranged immediately on the right side of the second processing target server 100 (fourth memory difference) (Step S619). In this step, the arrangement management part 160 calculates an absolute value of the difference in memory capacity between the respective servers 100.

The arrangement management part 160 determines whether or not a total value of the first memory difference and the second memory difference is equal to or larger than a total value of the third memory difference and the fourth memory difference (Step S621).

In a case where it is determined that the condition of Step S621 is satisfied, the arrangement management part 160 arranges the new server 100 on the left side of the first processing target server 100, and ends the processing (Step S623).

In a case where it is determined that the condition of Step S621 is not satisfied, the arrangement management part 160 arranges the new server 100 on the right side of the second processing target server 100, and ends the processing (Step S625).

In a case where it is determined in Step S611 that the condition of Step S611 is satisfied, the processing of the arrangement management part 160 proceeds to Step S617.

In a case where there are a plurality of servers 100 each having the largest memory capacity in the computer system, the server corresponding to the entry having the smallest identification number i is set as the second processing target server 100 and the server corresponding to the entry having the largest identification number i is set as the first processing target server 100.

It should be noted that, when there is only one server 100 having the largest memory capacity in the computer system, the first processing target server 100 and the second processing target server 100 are the same.

Processing to be performed in and after Step S617 is the same, and hence its description is omitted.

In a case where it is determined in Step S613 that the condition of Step S613 is satisfied, the processing of the arrangement management part 160 proceeds to Step S617.

In a case where there are a plurality of servers 100 each having the smallest memory capacity in the computer system, the server corresponding to the entry having the smallest identification number i is set as the second processing target server 100 and the server corresponding to the entry having the largest identification number i is set as the first processing target server 100.

Processing to be performed in and after Step S617 is the same, and hence its description is omitted.

Figure 18:
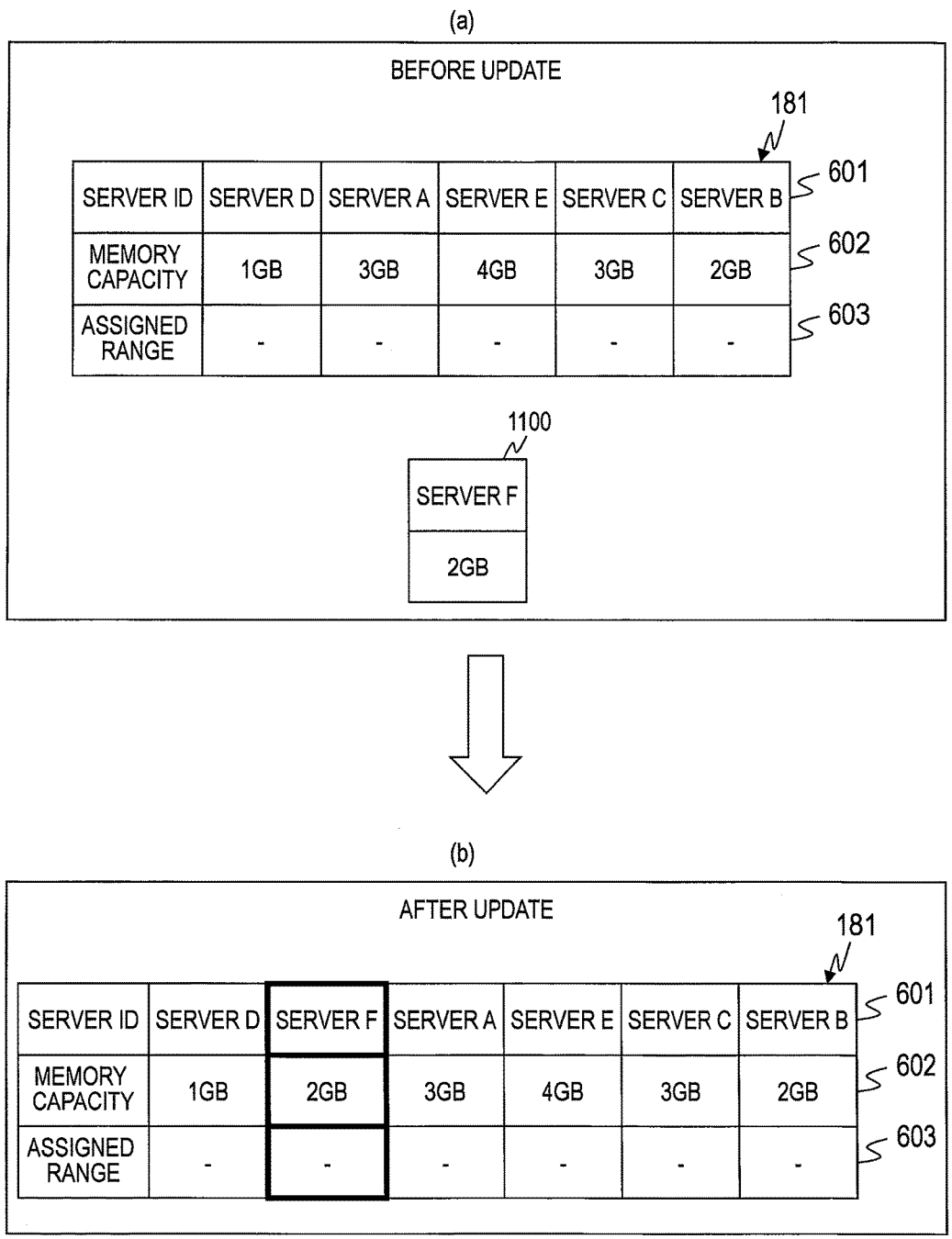
FIG. 18 is an explanatory diagram showing another example of the method of updating the performance management information 181 according to the second embodiment of this invention.

FIG. 18 is an explanatory diagram showing another example of the method of updating the performance management information 181 according to the second embodiment of this invention.

Part (a) of FIG. 18 shows the performance management information 181 before update. Part (b) of FIG. 18 shows the performance management information 181 after the update.

It is assumed here that the server ID of the new server 100 is "Server F" and its memory capacity is "2 GB". In this case, the arrangement management part 160 executes the processing of Steps S611 to S625 based on performance information 1100 having such a format as shown in part (a) of FIG. 18.

The performance information 1100 does not satisfy the respective conditions of Steps S611 and S613, and hence the processing of the arrangement management part 160 proceeds to Step S615.

In Step S615, the server B and the server D are each retrieved as the server 100 whose memory capacity is equal to or smaller than that of the memory of the new server F. In this case, the server D is set as the second processing target server 100 and the server B is set as the first processing target server 100.

In Step S621, because the total value of the first memory difference and the second memory difference is "1 GB" and the total value of the third memory difference and the fourth memory difference is "2 GB", it is determined that the condition of Step S621 is not satisfied.

The arrangement management part 160 therefore determines the position on the right side of the server D as the position of the server F in the arrangement. As a result, the performance management information 181 is updated as shown in part (b) of FIG. 18.

According to one embodiment of this invention, it is possible to construct the optimal distributed KVS in consideration of the difference in performance among the respective servers 100. To be specific, it is possible to set the slave servers so that the difference in performance between the master server and the slave server becomes smaller, and it is also possible to set the optimal width of the management range to be assigned to the master server (data amount of the plurality of pieces of replicated data). In addition, even when the server 100 is added or removed, it is possible to dynamically set the arrangement relationship of the slave servers and the width of the management range.

Various types of software illustrated in the present embodiment can be stored in various electromagnetic, electronic, and optical recording media and can be downloaded to a computer via a communication network such as the Internet.

Further, in the present embodiment, although an example of using software-based control has been described, part of the control may be realized by hardware.

While the present invention has been described in detail with reference to the accompanying drawings, the present invention is not limited to the specific configuration, and various changes and equivalents can be made within the scope of the claims.

What is claimed is:

1. A computer system, comprising:
a plurality of computers coupled to one another via a network, for executing a service by using a database constructed of a plurality of storage apparatuses included in the computers, each of the computers including:
a processor;
one of the storage apparatuses coupled to the processor; and
a network interface coupled to the processor and configured to communicate with the other computers via the network,
wherein, in each of the computers, the storage apparatus stores instructions that, when executed by the processor, causes the processor to:
store performance management information for managing respective performances of the computers, the performance management information including a plurality of storage capacities of the respective storage apparatuses included in each of the computers,
manage a plurality of pieces of data formed of a key and a data value in the database,
wherein each of the computers is allocated:
a plurality of pieces of master data which are respectively managed based on a distributed algorithm for determining a management range indicating a range of the keys allocated thereto, and
a plurality of pieces of replicated data corresponding to the pieces of master data managed by the other computers, and
wherein, in each of the computers, the storage apparatus further stores instructions that, when executed by the processor, causes the processor to:
obtain information on the performance from the each of the computers and update the performance management information based on the obtained information,
determine, based on comparing the storage capacities of the respective storage apparatuses included in the performance management information, the management range of the plurality of pieces of master data managed by each of the computers and a plurality of sub-computers, from among the computers, configured to store the pieces of replicated data corresponding to the pieces of master data managed by each of the computers,
wherein the management range of each of the computers and the sub-computers is determined so that a difference between the storage capacity of the storage apparatus included in one of the computers and the storage capacity of the storage apparatus included in one of the sub-computers corresponding to the one of the computers becomes smaller.

2. The computer system according to claim 1,
wherein, in each of the computers, the storage apparatus includes a memory and a disk apparatus,
wherein the database includes a memory store constructed of a storage area of the memory included in each of the computers and a disk store constructed of the disk apparatus included in each of the computers, and
wherein, in each of the computers, the storage apparatus further stores instructions that, when executed by the processor, causes the processor to:
calculate a combination of one of the computers and one of the sub-computers such that a difference in the storage capacity of the memory of the one of the computers and the storage capacity of the memory of the one of the sub-computers becomes smaller;
set the sub-computers for the each of the computers based on the calculated combination of the one of the computers and the one of the sub-computers;
determine an assigned width of the management range for each of the computers based on the calculated combination of the one of the computers and the one of the sub-computers; and
apply the distributed algorithm based on the determined assigned width of the management range to thereby determine the management range of each of the computers.

3. The computer system according to claim 2,
wherein, in each of the computers, the storage apparatus stores instructions that, when executed by the processor, causes the processor to:
store index information designating a processing performance of the database,
refer to the index information to determine whether or not an access performance of the database is required;
when it is determined that the access performance of the database is required, calculate the combination of the one of the computers and the one of the sub-computers such that the storage capacity of the memory included in the one of the computers is equal to or larger than the storage capacity of the memory included in the one of the sub-computers corresponding to the one of the computers and such that the difference in the storage capacity of the memory of the one of the computers and the storage capacity of the memory of the one of the sub-computers becomes smaller, and
determine the assigned width of the management range of each of the computers based on the storage capacity of the memory in each of the computers.

4. The computer system according to claim 3, wherein, in each of the computers, the storage apparatus stores instructions that, when executed by the processor, causes the processor to:
display an entry screen for entering the index information, and obtain the index information based on an operation performed through the entry screen.

5. The computer system according to claim 2,
wherein, in each of the computers, the storage apparatus stores instructions that, when executed by the processor, causes the processor to:
store index information designating a processing performance of the database,
refer to the index information to determine whether or not an access performance of the database and a usage efficiency of the storage capacity of the database are required;
when it is determined that the access performance of the database and the usage efficiency of the storage capacity of the database are required, calculate the combination of the one of the computers and the one of the sub-computers such that differences among the storage capacity of the memory included in the one of the computers that manages the plurality of pieces of master data corresponding to the plurality of pieces of replicated data held by the one of the computers, the storage capacity of the memory of the one of the computers, and the storage capacity of the memory of the one of the sub-computers corresponding to the one of the computers become smaller, and
determine the assigned width of the management range of each of the computers based on the storage capacity of the memory in each of the computers.

6. The computer system according to claim 1, wherein, in each of the computers, the storage apparatus stores instructions that, when executed by the processor, causes the processor to:
generate display information for displaying a difference in performance between each of the computers and each of the sub-computers corresponding to each of the computers and an assigned width of the management range of each of the computers.

7. A data allocation management method for a computer system including a plurality of computers coupled to one another via a network and being configured to execute a service by using a database constructed of a plurality of storage apparatuses included in the computers, the data allocation management method comprising:
storing performance management information for managing respective performances of the computers, the performance management information including a plurality of storage capacities of the respective storage apparatuses included in each of the computers;
managing a plurality of pieces of data formed of a key and a data value in the database, each of the computers being allocated a plurality of pieces of master data based on a distributed algorithm for determining a management range indicating a range of the keys allocated to each of the computers, and a plurality of pieces of replicated data corresponding to the pieces of master data managed by the other computers;
obtaining, by each of the computers, information on the performance from each of the computers and updating the performance management information based on the obtained information; and
determining, by each of the computers, based on comparing the storage capacities of the respective storage apparatuses included in the performance management information, the management range of the plurality of pieces of master data managed by each of the computers and a plurality of sub-computers, from among the computers, configured to store the pieces of replicated data corresponding to the pieces of master data managed by each of the computers,
wherein the management range of each of the computers and the sub-computers is determined so that a difference between the storage capacity of the storage apparatus included in one of the computers and the storage capacity of the storage apparatus included in one of the sub-computers corresponding to the one of the computers becomes smaller.

8. The data allocation management method according to claim 7,
wherein, in each of the computers, the storage apparatus includes a memory and a disk apparatus,
wherein the database includes a memory store constructed of a storage area of the memory included in each of the computers and a disk store constructed of the disk apparatus included in each of the computers, and
the data allocation management method further comprising:
calculating a combination of one of the computers and one of the sub-computers such that a difference in the storage capacity of the memory of the one of the computers and the storage capacity of the memory of the one of the sub-computers becomes smaller;
setting the sub-computers for the each of the computers based on the calculated combination of the one of the computers and the one of the sub-computers;
determining an assigned width of the management range for each of the computers based on the calculated combination of the one of the computers and the one of the sub-computers; and
applying the distributed algorithm based on the determined assigned width of the management range to thereby determine the management range of each of the computers.

9. The data allocation management method according to claim 8, further comprising:
storing, by each of the computers, index information designating a processing performance of the database;
referring to the index information to determine whether or not an access performance of the database is required; and
when it is determined that the access performance of the database is required, calculating the combination of the one of the computers and the one of the sub-computers such that the storage capacity of the memory included in the one of the computers is equal to or larger than the storage capacity of the memory included in the one of the sub-computers corresponding to the one of the computers and such that the difference in the storage capacity of the memory of the one of the computers and the storage capacity of the memory of the one of the sub-computers becomes smaller; and
determining the assigned width of the management range of each of the computers based on the storage capacity of the memory in each of the computers.

10. The data allocation management method according to claim 9, further comprising:
displaying an entry screen for entering the index information; and
obtaining the index information based on an operation performed through the entry screen.

11. The data allocation management method according to claim 8, further comprising:
storing, by each of the computers, index information designating a processing performance of the database;

referring to the index information to determine whether or not an access performance of the database and a usage efficiency of the storage capacity of the database are required; and when it is determined that the access performance of the database and the usage efficiency of the storage capacity of the database are required, calculating the combination of the one of the computers and the one of the sub-computers such that differences among the storage capacity of the memory included in the one of the computers that manages the plurality of pieces of master data corresponding to the plurality of pieces of replicated data held by the one of the computers, the storage capacity of the memory of the one of the computers, and the storage capacity of the memory of the one of the sub-computers corresponding to the one of the computers become smaller; and determining the assigned width of the management range of each of the computers based on the storage capacity of the memory in each of the computers.

12. The data allocation management method according to claim 7, further comprising:

generating display information for displaying a difference in performance between each of the computers and each of the sub-computers corresponding to each of the computers and an assigned width of the management range of each of the computers.

13. One or more non-transitory computer readable media with an executable program stored thereon, where the executable program causes each of a plurality of computers included in a computer system to execute a data allocation management method, the computer system including the plurality of computers coupled to one another via a network and being configured to execute a service by using a database constructed of a plurality of storage apparatuses included in the computers, each of the computers including:

a processor;

a storage apparatus coupled to the processor; and a network interface configured to communicate to and from the plurality of computers other than the each of the plurality of computers via the network, the data allocation method comprising:

storing performance management information for managing respective performances of the computers, the performance management information including a plurality of storage capacities of the respective storage apparatuses included in each of the computers;

managing a plurality of pieces of data formed of a key and a data value in the database, each of the computers being allocated a plurality of pieces of master data based on a distributed algorithm for determining a management range indicating a range of the keys allocated to each of the computers, and a plurality of pieces of replicated data corresponding to the pieces of master data managed by the other computers;

obtaining, by each of the computers, information on the performance from each of the computers and updating the performance management information based on the obtained information; and determining, by each of the computers, based on comparing the storage capacities of the respective storage apparatuses included in the performance management information, the management range of the plurality of pieces of master data managed by each of the computers and a plurality of sub-computers, from among the computers, configured to store the pieces of replicated data corresponding to the pieces of master data managed by each of the computers, wherein the management range of each of the computers and the sub-computers is determined so that a difference between the storage capacity of the storage apparatus included in one of the computers and the storage capacity of the storage apparatus included in one of the sub-computers corresponding to the one of the computers becomes smaller.

14. The one or more non-transitory computer readable media according to claim 13, wherein, in each of the computers, the storage apparatus includes a memory and a disk apparatus, wherein the database includes a memory store constructed of a storage area of the memory included in each of the computers and a disk store constructed of the disk apparatus included in each of the computers, and the data allocation management method further comprising:

calculating a combination of one of the computers and one of the sub-computers such that a difference in the storage capacity of the memory of the one of the computers and the storage capacity of the memory of the one of the sub-computers becomes smaller;

setting the sub-computers for the each of the computers based on the calculated combination of the one of the computers and the one of the sub-computers;

determining an assigned width of the management range for each of the computers based on the calculated combination of the one of the computers and the one of the sub-computers; and applying the distributed algorithm based on the determined assigned width of the management range to thereby determine the management range of each of the computers.

15. The one or more non-transitory computer readable media according to claim 14, the data allocation management method further comprising:

storing, by each of the computers, index information designating a processing performance of the database;

referring to the index information to determine whether or not an access performance of the database is required; and when it is determined that the access performance of the database is required, calculating the combination of the one of the computers and the one of the sub-computers such that the storage capacity of the memory included in the one of the computers is equal to or larger than the storage capacity of the memory included in the one of the sub-computers corresponding to the one of the computers and such that the difference in the storage capacity of the memory of the one of the computers and the storage capacity of the memory of the one of the sub-computers becomes smaller; and determining the assigned width of the management range of each of the computers based on the storage capacity of the memory in each of the computers.

16. The one or more non-transitory computer readable media according to claim 14, the data allocation management method further comprising:

storing, by each of the computers, index information designating a processing performance of the database;

referring to the index information to determine whether or not an access performance of the database and a usage efficiency of the storage capacity of the database are required; and when it is determined that the access performance of the database and the usage efficiency of the storage capacity of the database are required, calculating the combination of the one of the computers and the one of the sub-computers such that differences among the storage capacity of the memory included in the one of the computers that manages the plurality of pieces of master data corresponding to the plurality of pieces of replicated data held by the one of the computers, the storage capacity of the memory of the one of the computers, and the storage capacity of the memory of the one of the sub-computers corresponding to the one of the computers become smaller; and determining the assigned width of the management range of each of the computers based on the storage capacity of the memory in each of the computers.

17. The one or more non-transitory computer readable media according to claim 13, the data allocation management method further comprising:

displaying an entry screen for entering the index information; and obtaining the index information based on an operation performed through the entry screen.

18. The one or more non-transitory computer readable media according to claim 13, the data allocation management method further comprising:

generating display information for displaying a difference in performance between each of the computers and each of the sub-computers corresponding to each of the computers and an assigned width of the management range of each of the computers.

* * * * *